(12) United States Patent
Kumar et al.

(10) Patent No.: US 10,909,094 B1
(45) Date of Patent: Feb. 2, 2021

(54) MIGRATION SCHEDULING FOR FAST-MUTATING METADATA RECORDS

(71) Applicant: Amazon Technologies, Inc., Seattle, WA (US)

(72) Inventors: Sandeep Kumar, Sammamish, WA (US); Ankit Singh, Seattle, WA (US); Varun Verma, Newcastle, WA (US); Rajkrishnan Parameswaran, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 283 days.

(21) Appl. No.: 15/967,433

(22) Filed: Apr. 30, 2018

(51) Int. Cl.
  *G06F 16/21* (2019.01)
  *G06F 16/27* (2019.01)

(52) U.S. Cl.
  CPC .......... *G06F 16/214* (2019.01); *G06F 16/27* (2019.01)

(58) Field of Classification Search
  CPC ................................ G06F 16/214; G06F 16/27
  USPC ......................................................... 707/624
  See application file for complete search history.

(56) References Cited

U.S. PATENT DOCUMENTS

| | | | | |
|---|---|---|---|---|
| 9,098,214 | B1* | 8/2015 | Vincent | G06F 9/4856 |
| 2006/0129771 | A1 | 6/2006 | Dasgupta et al. | |
| 2007/0198797 | A1* | 8/2007 | Kavuri | G06F 3/061 |
| | | | | 711/165 |
| 2008/0222218 | A1* | 9/2008 | Richards | G06F 3/0653 |
| 2008/0263551 | A1* | 10/2008 | Ali | G06F 11/1461 |
| | | | | 718/102 |
| 2009/0193206 | A1 | 7/2009 | Ishii et al. | |
| 2011/0010518 | A1* | 1/2011 | Kavuri | G06F 3/0647 |
| | | | | 711/165 |
| 2013/0227127 | A1 | 8/2013 | Takano et al. | |
| 2015/0212897 | A1* | 7/2015 | Kottomtharayil | G06F 11/1448 |
| | | | | 714/20 |
| 2016/0162369 | A1* | 6/2016 | Ahn | G06F 11/1451 |
| | | | | 707/654 |
| 2016/0170665 | A1* | 6/2016 | Alatorre | G06F 3/0605 |
| | | | | 711/154 |
| 2017/0206144 | A1* | 7/2017 | Ahn | G06F 11/1451 |
| 2017/0262520 | A1* | 9/2017 | Mitkar | G06F 16/275 |
| 2019/0236150 | A1* | 8/2019 | Zaslavsky | G06F 16/2308 |
| 2019/0288915 | A1* | 9/2019 | Denyer | H04L 41/12 |

* cited by examiner

*Primary Examiner* — Evan Aspinwall
(74) *Attorney, Agent, or Firm* — Robert C. Kowert; Kowert, Hood, Munyon, Rankin & Goetzel, P.C.

(57) ABSTRACT

Systems and methods are provided to implement a metadata record migration system that schedules the migrations of metadata records that are frequently mutated. In embodiments, the scheduler collects timing data of jobs that modify the metadata records, including the timing of various mutation operations within the jobs. In embodiments, when it is determined that a metadata record is to be migrated to a different storage location, the scheduler determines a time to migrate the metadata record. The migration time may lie within a migration window, selected based on an expected migration time needed for the metadata record and the collected time data in order to reduce a probability that record mutations will occur during the migration. In embodiments, the jobs may be snapshot jobs that modify a snapshot record, and the migration may be performed as a result of a cell partitioning operation occurring within the snapshotting system.

20 Claims, 11 Drawing Sheets

MIGRATION SCHEDULING FOR FAST-MUTATING METADATA RECORDS

BACKGROUND

The recent revolution in technologies for dynamically sharing virtualizations of hardware resources, software, and information storage across networks has increased the reliability, scalability, and cost efficiency of computing. More specifically, the ability to provide on demand virtual computing resources and storage through the advent of virtualization has enabled consumers of processing resources and storage to flexibly structure their computing and storage costs in response to immediately perceived computing and storage needs. Virtualization allows customers to purchase processor cycles and storage at the time of demand, rather than buying or leasing fixed hardware in provisioning cycles that are dictated by the delays and costs of manufacture and deployment of hardware. Rather than depending on the accuracy of predictions of future demand to determine the availability of computing and storage, users are able to purchase the use of computing and storage resources on a relatively instantaneous as-needed basis.

Virtualized computing environments are frequently supported by storage services such as block-based storage services. Some such storage services implement functionality to take incremental snapshots on data volumes to provide durable point in-time checkpoints. In some cases, the use case for these snapshots have evolved such that customers will take snapshots on their volumes very rapidly, for example, once every few seconds. The creation of an incremental snapshot on a volume may be a long duration process and, depending on the size of volume and count of changed blocks, could take more than 24 hours to complete. As a result, a data volume may have multiple stacked snapshots pending at a given time, at different stages of completion. In such situations, it is generally difficult to find an appropriate time window to schedule a migration of the snapshot record of a data volume, which is being mutated by the frequent snapshots. An attempt to take a snapshot of the volume while the snapshot record is in migration may cause the snapshotting process to be delayed or fail altogether. The problem is exacerbated in storage services that maintain a large number of snapshot records on shared computing resources, which are being mutated by a large number of snapshot processes.

Figure 1:
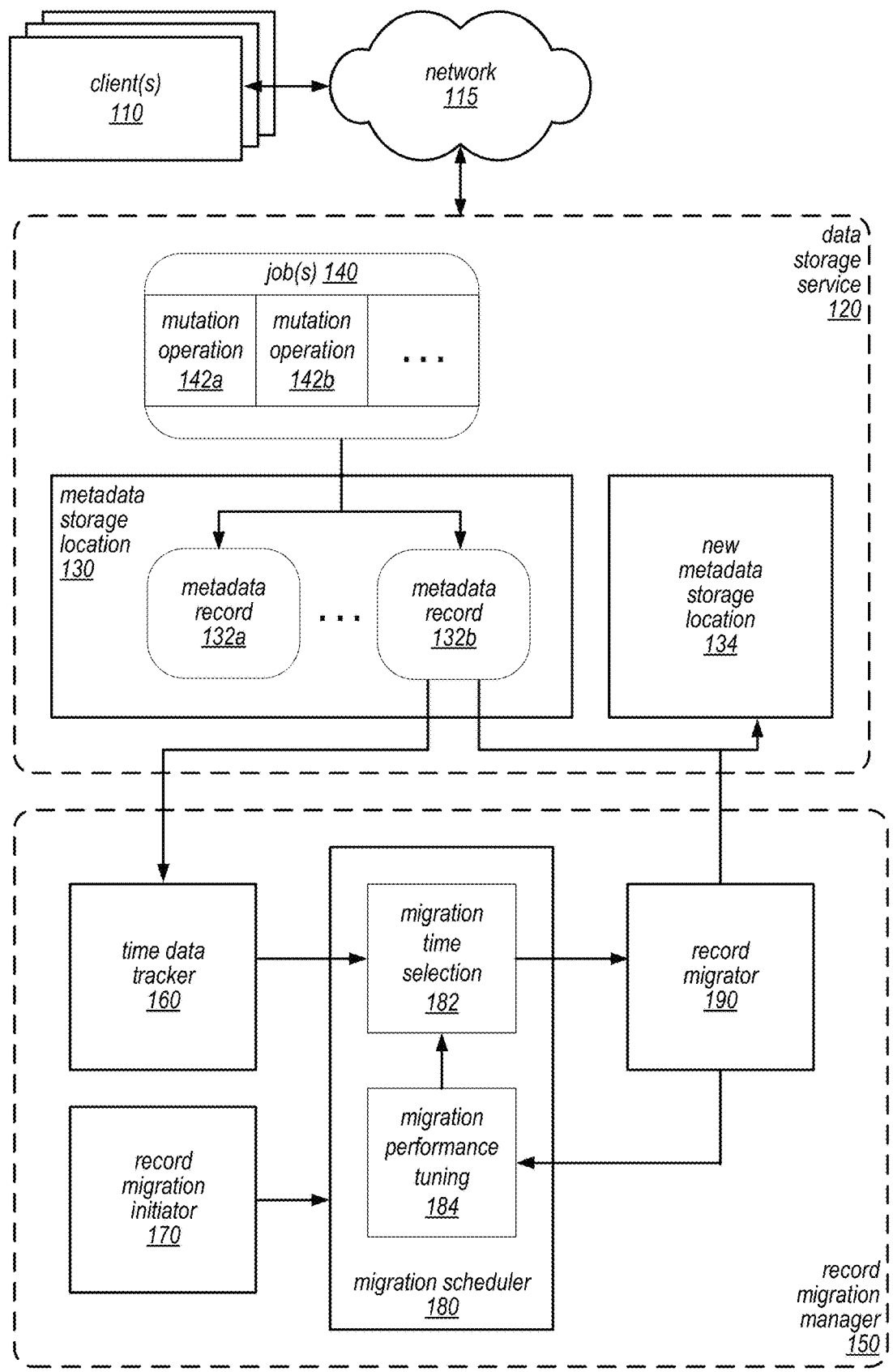
FIG. 1 is a block diagram illustrating an example data store metadata record migration system that schedules record migrations based on observed record mutations, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods described herein may be employed in various combinations and in various embodiments to implement a metadata record migration system that schedules migrations of the metadata records based on observed mutations of the metadata records. In some embodiments, the metadata record management system may be a snapshotting system or service that creates and manages snapshots of data stores. In some embodiments, a snapshot may be a long running process that mutates a snapshot or metadata record for the data store via different mutation operations. The metadata record migration system may collect time data for snapshotting jobs and their mutations of the snapshot records over a period of time, and then use the collected time data to select appropriate times to migrations of individual snapshot records.

The snapshotting system or service may allow customers to take frequent incremental snapshots of a data store or data volume, for example, once every few seconds. Depending on the size of data store or volume and amount of changed data, it could take 24 hours or more to complete a snapshot. As a result, in some embodiments, a data store or volume may have multiple stacked snapshots pending at a given time, at different stages of completion. In such situations, it is generally difficult to find an appropriate time to schedule a migration of the snapshot record, as it is being constantly mutated by the snapshotting jobs. An attempt to take a snapshot of the data store or volume while the snapshot record is in migration may cause the snapshotting process to be delayed or fail altogether.

To address such difficulties, embodiments of the disclosed system may monitor the jobs that mutate the metadata records over a period of time, and collect time data for any mutations, in order to learn the mutation behavior of the metadata record. The collected time data may then be programmatically analyzed to determine an appropriate time to perform the migration of the metadata record. In some embodiments, the scheduling process may be driven by one or more rules or goals specified in a scheduling policy. For example, in some embodiments, the schedule may be performed to reduce a likelihood that updates or mutations to a metadata record will occur during the migration. In some embodiments, the scheduling may be performed so that no expected snapshotting jobs or record mutation events occur during the scheduled migration time. In this manner, the ongoing snapshotting jobs in the system are less likely to be delayed or fail as the result of a record migration.

In some embodiments, the scheduling policy may specify that the migration should be performed, when possible, during a steady state period of the metadata record. That is, the migration should occur when no unfinished jobs (e.g., snapshotting processes) are pending for on the metadata record. In some embodiments, if no acceptable steady state period can be found for the record migration based on the collected time data, the system may next look for interim periods between adjacent mutation operations in the collected time data. For example, in the case of the snapshotting process, the process may only modify the snapshot record at certain times during the process (e.g., at the beginning and end of the snapshot process). In that case, the system may choose to migrate the snapshot record during one of these interim periods. By employing these strategies, risks of the migration disrupting the pending jobs will be reduced. In some embodiments, migration during interim periods are less preferred than during steady state periods, as a migration during an interim period may cause the record to be migrated in an inconsistent state.

In some embodiments, the system may select only certain types of interim periods to perform the migration. For example, the system may only select interim periods that end in a mutation operation that is not synchronously visible to a client (e.g., a snapshot completion operation that does not report back to the client immediately). This way, even if the migration process unexpectedly extends past the selected migration window, the detrimental impacts of the fault (e.g., added latency caused to snapshot completion operation) are not directly experienced by the user or client. On the other hand, if a fault occurs on an operation that is synchronously visible to the client, such as a snapshot initiation operation, the user or client application will immediately experience the effects of the fault. Thus, by selecting only interim periods that end in non-synchronously-visible operations to perform the migration, the system enhances the perceived performance of the jobs as seen by the user or client.

In some embodiments, migrations may occur for a large number of record within a relatively short period of time. For example, in some embodiments, many migrations may be caused by a single event, such as a partition within the data store or snapshotting system. For example, in a partition, a cell of computing resources is automatically partitioned into two or more cells in response to a scaling event. In that case, a subset of the metadata records on the original cell must be scheduled for migration to a new cell within a short period of time. In some embodiments, the system may build a minimum priority queue of migrations based on the collected time data for the subset of records to be migrated. The records may then be migrated according to the schedule. In some embodiments, the scheduling may strive to migrate the metadata records as fast as possible while minimizing the probability of collisions with mutating jobs.

In some embodiments, in order to determine whether a given record migration may be performed in an observed window (whether a steady state period or an interim period), the system may compare the window against an expected migration duration of the record. In some embodiments, the expected migration duration may be computed or updated based on a variety of factors. For example, in some embodiments, the expected migration duration may depend on the size of the record. In some embodiments, the expected migration duration may include a safety factor, which augments a theoretical migration duration to account for variations in system conditions at the actual time of migration. For example, at the actual time of migration, the system may be experiencing abnormally high load or network latency, which causes the actual migration to take longer. The safety factor may be used to account for this sort of variation in the actual migration duration.

In some embodiments, the system may programmatically adjust the safety factor based on actual migration results or performance metrics. For example, in some embodiments, the system may maintain a fault counter that tracks a number of faults (e.g., when a mutation operation that occurred on a record during the migration of the record). When the number or frequency of faults exceeds a specified threshold, the system may increase the safety factor, so that the scheduling of migrations is performed more conservatively. In some embodiments, when the number or frequency of faults fall below a threshold, the system may decrease the safety factor, so that migrations can be scheduled more aggressively.

The disclosed system components and techniques improves the functioning of previous metadata record migration systems or snapshotting systems. For example, the collection of time data allows the system learn the way that the metadata records are modified in the system, which in some cases may be highly regular and predictable. As a result, the system is able to use such knowledge to programmatically select low risk windows to perform the record migrations, without any manual analysis or intervention from the system operator. These features are particularly useful in systems managing large numbers of metadata records and record modifying jobs. These features are also particular useful in systems where unplanned migrations can be triggered based on system conditions and without warning.

Additionally, the disclosed system and techniques allow the scheduling process to programmatically adapt to the changing conditions of the system. For example, in some embodiments, the system automatically adjusts a safety factor used to determine expected migrations durations in the system. The system may then capture performance metrics, for example fault counts, that are indicative of the quality of the scheduling decisions. In some embodiments, if too many faults are detected over an evaluation period (for example because of unexpected system operating conditions), the system may increase the safety factor to account for these unexpected conditions. As may be understood, increasing the expected migration duration forces the system to select larger migration windows, which may reduce the number of faults. On the other hand, if the fault count remains low for a sufficient period of time, the system may decrease the safety factor to allow for more aggressive scheduling, which may result in faster migration times. These and other features and benefits of the inventive system and method are described in further detail below, in connections with the figures.

FIG. 1 is a block diagram illustrating an example data store metadata record migration system that schedules record migrations based on observed record mutations, according to some embodiments. As shown, in some embodiments, the metadata record migration system 150 may operate to perform migrations of metadata records for a data storage service 120, which may host data for clients 110.

In some embodiments, the data storage service 120 may be a cloud-based service that hosts data stores, such as block- or chunk-based data volumes, of clients. In some embodiments, the data storage service 120 may implement other types of data storage, such as for example a database, a file system, or the like. The data storage service 120 may implement one or more service endpoints configured to receive and process service requests, such as requests to access data objects maintained on behalf of clients/users, and/or the items and attributes stored in those data objects. For example, data storage service 120 may include hardware and/or software configured to implement various service endpoints and to properly receive and process HTTP-based web services requests directed to those endpoints. In one embodiment, data storage service 120 may be implemented as a server system configured to receive web services requests from clients and to forward them to various components that collectively implement a data storage system for processing. In some embodiments, data storage service 120 may be configured as a number of distinct systems (e.g., in a cluster topology) implementing load balancing and other request management features configured to dynamically manage large-scale web services request processing loads.

In some embodiments, the data storage service 120 may include different versions of some of the components illustrated in the figure to provide functionality for creating, accessing, and/or managing tables and/or indexes maintained in database instances within a single-tenant environment than those that provide functionality for creating, accessing, and/or managing tables and/or indexes maintained in database instances within a multi-tenant environment. In various embodiments, the components in the data storage service 120 may be implemented directly within computer hardware, as instructions directly or indirectly executable by computer hardware (e.g., a microprocessor or computer system), or using a combination of these techniques. For example, the components of the data storage service 120 may be implemented by a distributed system including a number of computing nodes (or simply, nodes), such as computing systems described below. In some embodiments, the functionality of a given storage service system component may be implemented by a particular computing node or may be distributed across several computing nodes. In some embodiments, a given computing node may implement the functionality of more than one storage service system component.

In some embodiments, as shown, the metadata record migration manager 150 may manage the migration of metadata records, such as metadata records 132a and 132b for the data storage service 120. As shown, in some embodiments, the metadata records may be stored in a metadata storage location 130. The metadata storage location 130 may reside within the data storage service 120, the record migration manager 150, or somewhere else. As shown, in some embodiments, there may be multiple storage locations to store metadata records, such as for example new metadata storage location 134. In addition, although in the figure the metadata record migration manager 150 is shown to be separated from the data storage service 120, in some embodiments, the metadata record migration manager 150 may be a part of or tightly coupled with the data storage service 120. In some embodiments, the metadata record migration manager may 120 may be connected to the data storage service 120 via a network, which may be a private or public network.

In some embodiments, the metadata records 132 may be associated with the individual data stores. These records may contain metadata concerning their respective data stores that are useful to the data storage service or the metadata record migration manager 150. For example, in some embodiments, the metadata record migration manager 150 may comprise a tokenization subsystem that replaces sensitive data in the data stores with encrypted data tokens. In that case, the metadata records 132 may, for example, contain information that allow the data tokens to be decrypted into the actual data. As another example, in some embodiments, the metadata record migration manager may implement a number of materialized views of the data stores. In that case, the metadata records may contain processed data that are part of the materialized views, such as for example aggregated data items, etc. As yet another example, in some embodiments, the metadata record migration manager 150 may be a snapshotting service that takes periodic incremental snapshots of the data stores. In that case, the metadata records may contain information that allow the incremental snapshots to be recomposed into a point-in-time view of the data store. In different embodiments, these metadata records may be frequently mutated based on the operations of the data storage service or the metadata record migration manager.

In some embodiments, one source of mutations of these metadata records may be a job generator that generates jobs 140, which may mutate the metadata records. In some embodiments, these jobs 140 may be long running processes that may overlap with one another. In some embodiments, the jobs 140 may contain one or more mutation operations 142 that modify the metadata records 132. For example, in the snapshotting application, the jobs 140 may be a long running snapshotting process on a data store. In some embodiments, the metadata record may be a snapshot record of the data store, which may include metadata such as the historical sequence of incremental snapshots taken on the data store. In some embodiments, the metadata record 132 may allow the snapshotting service to quickly reproduce a snapshot of the data store at any given time. For example, the metadata record may include metadata that allow the snapshotting service to reconstruct a snapshot of a data volume that reflects the state of the volume two days ago.

In some embodiments, the mutation operations 142 may occur only at certain points in the job process. In some embodiments, these mutation operations may an atomic operation that modifies the metadata record, even though the job itself is not atomic. For example, in some embodiments, the job may update the metadata record in stages, where a mutation operation is performed at each stage. In some embodiments, the mutation operations may occur at the beginning and completion of the job. In some embodiments, mutation operations 142 may be either synchronously visible to the client or not. Synchronously visible operations may be operations that are immediately seen or experienced by a user or a client. For example, in some embodiments, a job initiation operation may be a synchronously visible operation, because the job generator call interface may specify that a response is immediately provided back to the client, which may indicate whether the job is successfully initiated or not. On the other hand, in some embodiments, a job completion operation may not be synchronously visible to the client. For example, when a long running job such as a snapshotting job finally completes, the metadata record may be updated a final time but without immediately alerting the client or user that initiated the job. In some embodiments, if a job were to fail, it is preferable that the job fails on an operation that is not synchronously visible to the client, because such failures are more tolerable to the client.

As shown, in some embodiments, the metadata record migration manager 150 may implement a time data tracker 160. In some embodiments, the time data tracker 160 may be a hardware component of software module, or a combination thereof, that is tasked with observing the mutation behavior of the metadata records 132. For example, as the jobs 140 periodically mutates the records 132, the times at which such mutations occur may be recorded. In some embodiments, the time data tracker 160 may track all types of record mutations, not only the mutations that are caused by the jobs 140. In some embodiments, time data tracker 160 may record the types of mutation operations that are responsible for modifying the records. In some embodiments, the tracker 160 may perform this time data collection continually, so that the migration manager is constantly learning about the mutations patterns of the records 132. In some embodiments, the time data tracker 160 may collect data only specified or random times, or only on specified records.

In some embodiments, the time data tracker 160 may output a set of record mutation time data. In some embodiments, the output data may be maintained in volatile memory. In some embodiments, the data may be stored in more persistent form, for example, a log file or a more sophisticated data repository. In some embodiments, this output data may simply comprise the raw data of when mutations occurred on each record, and what jobs are pending on each record. In some embodiments, the data may also include basic analytical data, such as for example a preliminary identification of different types of migration windows, such as steady state periods or interim periods between mutation events. In some embodiments, the time data collector may indicate a confidence level associated with each window, which may indicate the probability that the window will recur in future time periods. For example, the record mutation time data may indicate that, with 99% confidence, a steady state window will occur from 9:00 a.m. to 10:00 a.m. on a particular metadata record, because over the last seven days, no jobs were pending on that record during that hour.

As shown, in some embodiments, the metadata record migration manager 150 may implement a record migrator 190. The record migrator may be a hardware component, a software module, or a combination thereof, which is responsible for migrating the metadata records 132, for example, from the one metadata storage location 130 to another metadata storage location 134. In some embodiments, the record migrator 190 may not be implemented as part of the metadata record migration manager, but as a separate or external component of the manager. In some embodiments, the migration may involve moving the data, for example, moving the metadata record from one computing resource to another. For example, in some embodiments, the migrator 190 may move a record from one physical or virtual computing resource in response to a scaling event.

As shown, in some embodiments, the metadata record migration manager 150 may implement a record migration initiator 170. The record migration scheduler 180 may be implemented as a hardware component, a software module, or a combination thereof, and may be tasked with initiation migrations of the metadata records 132. For example, in some embodiments, the metadata record migration manager 150 may automatically scale its resources by occasionally adding or removing computing resource instances based on the demand or load of the system. When a new instance is added (for example during a partitioning operation), metadata records may be migrated to the new instance. When an existing instance is retired, the records hosted on that instance may be migrated elsewhere. In some embodiments, the manager 150 may also periodically reboot computing resources instances for routine housekeeping or maintenance purposes, and such rebooting may also be accompanied by a migration of the records on those instances. In some embodiments, the migrator 190 may convert the record to a different form. For example, in some embodiments, the records may be migrated from one type of database to another, as part of a system upgrade. In that case, the record migrator may perform certain transformations of the records during the migration.

As shown, in some embodiments, the metadata record migration manager 150 may implement a record migration scheduler 180. The record migration scheduler 180 may be implemented as a hardware component, a software module, or a combination thereof, and may be tasked with selecting appropriate times to perform the migration of individual records 132. In some embodiments, the scheduler 170 may perform the migration scheduling using the record mutation time data collected by the time data tracker 160. In some embodiments, the scheduler 180 may determine possible migration windows for a record in the time data, and then select a time within a window to perform the migration. In some embodiments, the selection may be performed via a migration time selector 182, as shown.

In some embodiments, the migration time selector 182 may select, based on the collected time data, migration windows for a record. The migration windows may include one or more steady state periods when no uncompleted jobs are pending on a given record 132. The selector 182 may use one of these steady state windows to perform the migration of the record. In some embodiments, the selector may determine that multiple steady state periods exist for a particular record and may choose one period for the migration. For example, in some embodiments, the selection may be based on the respective lengths or sizes of the observed steady state periods. In some embodiments, longer steady states may be preferred. In some embodiments, shorter steady state periods that are sufficient to accommodate the expected migration time of the record may be preferred. In some embodiments, a determined probability of the steady state period (e.g., how certain the period will occur in the future) may also be used. For example, highly uncertain steady state periods may be ignored by the selector.

In some embodiments, the migration time selector 182 may select, based on the collected time data, one or more interim periods that occur between adjacent mutation operations for a record 132. The selector 182 may use one of the interim periods to perform the migration of the record. In some embodiments, the selector may determine that multiple interim periods can be used for the migration of the particular record and choose one period for the migration. For example, in some embodiments, the selection may be based on the respective lengths or sizes of the observed interim periods. In some embodiments, longer interim periods may be preferred, while in other embodiments, shorter interim periods may be preferred. In some embodiments, the selection may also be dependent on a determine probability of the interim period (e.g., how certain the period will occur in the future). For example, highly uncertain interim periods may be ignored by the selector.

In some embodiments, the selector 182 may only select (or prefer) interim periods that end in an operation that is not synchronously visible to clients. For example, a snapshot initiation operation may be a synchronously visible operation, where the operation immediately reports back to the request client whether a new job was successfully initiated. On the other hand, a job may also have operations that are not synchronously visible to clients. For example, a snapshot completion operation may not be synchronously visible. Such an operation may modify the record 132, but may not provide immediate feedback to the client. In selecting interim periods to migrate the record, the selector 182 may prefer to use interim periods ending in non-synchronously visible operations, because faults that occur with such periods are less disruptive to the client.

In some embodiments, the migration window selector 182 may prefer to use steady state periods to migrate a record, instead of an interim period. This is because in some embodiments, performing the migration during an interim period may involve migrating a record that is not in a consistent state. If the migration fails during an interim period, it may be more difficult to recover the record into a consistent state. For example, the recovery process may involve undoing some of the mutations performed by uncompleted jobs. However, depending on how difficult (or risky) it is to migrate a record using its observed steady state periods, in some embodiments, the selector 182 may elect to use the interim periods instead.

As shown, in some embodiments, the record migration scheduler 180 may include a migration performance tuner 184. The tuner 184 may be configured to observe or monitor the results of the migrations performed by the record migrator 190. In some embodiments, the performance results may indicate a quality metric reflecting how good the selected migrations windows were in avoiding faults. For example, in some embodiments, the tuner 184 may collect data via a fault counter, which counts the number of times that a fault was observed in a period of migrations. A fault may be an instance where a record mutation operation occurred during the time that the record is being migrated. As discussed, such an occurrence may cause the mutation operation (or the job) to experience added latency or be failed altogether. In some embodiments, if the number or a frequency of faults are deemed to exceed a threshold or criterion, the tuner 184 may instruct the selector 182 to increase the expected migration duration of records used to select migration times, so that the selection becomes more conservative (e.g., selects only larger periods for the migration). In some embodiments, if the number or frequency of the faults fall below a threshold or criterion, the tuner 184 may cause the selector 182 to decrease the expect migration time of records, so that the selection becomes more aggressive (e.g., selects smaller periods). In some embodiments, adjustment of the expected migration duration may involve changing a safety factor that is used to pad a theoretical migration time. The safety factor may be used to account for factors such as variations in system operating conditions, for example. In some embodiments, the migration performance tuner 184 may collect and use different types of performance metrics to adjust the scheduling process. For example, in some embodiments, the tuner 184 may determine the actual migration time of a number of migrations and use the actual times to adjust the expect migration duration of the records.

Figure 2A:
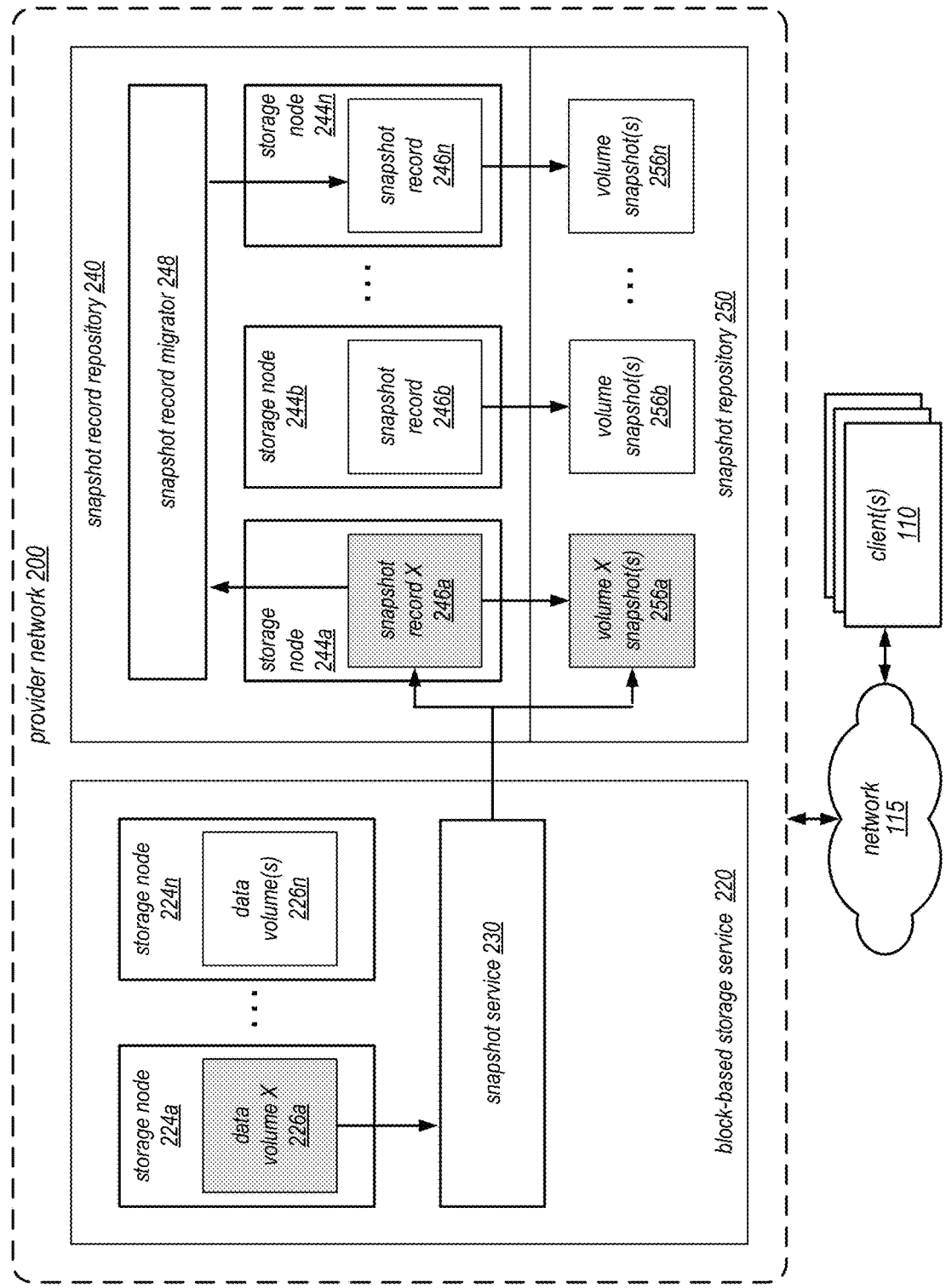
FIG. 2A is a block diagram illustrating an example data store snapshotting service that schedules record migrations based on observed record mutations, according to some embodiments.

FIG. 2A is a block diagram illustrating an example data store snapshotting service that schedules record migrations based on observed record mutations, according to some embodiments.

As shown, a provider network 200 may be set up by an entity such as a company or a public sector organization to provide one or more services (such as various types of cloud-based computing or storage) accessible via the Internet and/or other networks to clients 110. Provider network 200 may include numerous data centers hosting various resource pools, such as collections of physical and/or virtualized computer servers, storage devices, networking equipment and the like needed to implement and distribute the infrastructure and services offered by the provider network 200. In some embodiments, provider network 200 may provide computing resources, such as virtual compute service, storage services, such as block-based storage service 220 that includes a snapshot service 230, and/or any other type of network-based services. Clients 110 may access these various services offered by provider network 200 via network 115, which may be the same clients 110 and network 115 show in FIG. 1. Likewise, the network-based services may themselves communicate and/or make use of one another to provide different services. For example, computing resources offered to clients 110 in units called "instances," such as virtual or physical compute instances or storage instances, may make use of particular data volumes 226, providing virtual block storage for the compute instances.

In some embodiments, a virtual compute service may offer various compute instances to clients 110. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service in different embodiments, including general purpose or special purpose computer servers, storage devices, network devices and the like. In some embodiments instance clients 110 or other any other user may be configured (and/or authorized) to direct network traffic to a compute instance. In various embodiments, compute instances may attach or map to one or more data volumes 226 provided by block-based storage service 220 in order to obtain persistent block-based storage for performing various operations.

In some embodiments, compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client applications, without for example requiring the client 110 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

In some embodiments, compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc., and (in the case of reserved compute instances) reservation term length.

In various embodiments, provider network 200 may also implement block-based storage service 220 for performing storage operations. Block-based storage service 220 is a storage system, composed of a pool of multiple independent storage nodes 224a, 224b, through 224n (e.g., server block data storage systems), which provide block level storage for storing one or more sets of data volumes data volume(s) 226a, 226b, through 226n. Data volumes 226 may be mapped to particular clients, providing virtual block-based storage (e.g., hard disk storage or other persistent storage) as a contiguous set of logical blocks. In some embodiments, a data volume 226 may be divided up into multiple data chunks (including one or more data blocks) for performing other block storage operations, such as snapshot operations or replication operations.

As shown, in some embodiments, the block-based storage service 200 may include a snapshot service 230. The snapshot service may take snapshots of the volumes and store them in a snapshot repository 250, as shown. A volume snapshots of a data volume 256 may be a fixed point-in-time representation of the state of the data volume 226. In some embodiments, volume snapshots 256 may be stored remotely from a storage node 224 maintaining a data volume, such as in a snapshot repository 250. In addition, snapshot records 246 that contain metadata information about these snapshots 256 may be stored in yet another repository, such as the snapshot record repository 240, as shown. The snapshot record repository may be a database that can be queried, in some embodiments. In some embodiments, the snapshot records 246 may refer to the volume snapshots 256 of a single volume 226. Snapshotting jobs may be performed to send, copy, and/or otherwise preserve the snapshot of a given data volume in another storage location, such as a remote snapshot data store in the snapshot service 230 over various different internal or external communication systems, devices, or networks implemented as part of provider network 200.

In some embodiments, the snapshot record repository 240 may include storage nodes 244 that managed or store the volume snapshot records 246 of the volumes 226. For example, as shown, the snapshot record X 246a for volume X 226a is managed by the storage node 244a in the snapshot record repository. In some embodiments, each volume or data store may be associated with a corresponding snapshot record 246, such as the snapshot record for volume X 246a. These snapshot record may include metadata that indicates the history or sequence of all snapshots taken for that volume and allow multiple snapshots to be combined to produce a point-in-time view of the volume. In some embodiments, these snapshots are mutated by the snapshot jobs executed by the snapshot service 230. Moreover, in some embodiments, these snapshot records 246 must be migrated between the computing resources of the snapshot record repository. This migration may be performed by the snapshot record migrator 248, which in some embodiments may implement some of the functionalities of the time data tracker 160, record migration initiator 170, migration scheduler 180, and record migrator 190 as shown in FIG. 1.

In some embodiments, the snapshot record repository 240 may implement a service control plane to assist in the operation of snapshot service 230. In various embodiments, the service control plane assists in managing the availability of snapshotting service to clients, such as programs executing on compute instances provided by virtual compute service and/or other network-based services located within provider network 200 and/or optionally computing systems located within one or more other data centers, or other computing systems external to provider network 200 available over a network 115. Access to snapshots 256 may be provided over an internal network within provider network 200 or externally via network 115, in response to block data transaction instructions.

In some embodiments, as shown, the provider network 200 may implement other network-based services, which may include various different types of analytical, computational, storage, or other network-based system allowing clients 110, as well as other services of provider network 200

(e.g., block-based storage service 220 and/or snapshot service 230) to perform or request various tasks.

In some embodiments, the clients 110 may encompass any type of client configurable to submit requests to network provider 200. For example, a given client 110 may include a suitable version of a web browser, or may include a plug-in module or other type of code module configured to execute as an extension to or within an execution environment provided by a web browser. Alternatively, a client 110 may encompass an application such as a database application (or user interface thereof), a media application, an office application or any other application that may make use of compute instances, a data volume 226, a snapshot 246, or other network-based service in provider network 200 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 110 may be configured to generate network-based services requests according to a Representational State Transfer (REST)-style network-based services architecture, a document- or message-based network-based services architecture, or another suitable network-based services architecture. In some embodiments, a client 110 (e.g., a computational client) may be configured to provide access to a compute instance, data volume 226, or snapshot 256 in a manner that is transparent to applications implement on the client 110 utilizing computational resources provided by the compute instance or block storage provided by the data volume 226.

In some embodiments, clients 110 may convey network-based services requests to provider network 200 via external network 115. In various embodiments, external network 115 may encompass any suitable combination of networking hardware and protocols necessary to establish network-based communications between clients 110 and provider network 200. For example, a network 115 may generally encompass the various telecommunications networks and service providers that collectively implement the Internet. A network 115 may also include private networks such as local area networks (LANs) or wide area networks (WANs) as well as public or private wireless networks. For example, both a given client 110 and provider network 200 may be respectively provisioned within enterprises having their own internal networks. In such an embodiment, a network 115 may include the hardware (e.g., modems, routers, switches, load balancers, proxy servers, etc.) and software (e.g., protocol stacks, accounting software, firewall/security software, etc.) necessary to establish a networking link between given client 110 and the Internet as well as between the Internet and provider network 200. It is noted that in some embodiments, clients 110 may communicate with provider network 200 using a private network rather than the public Internet.

Figure 2B:
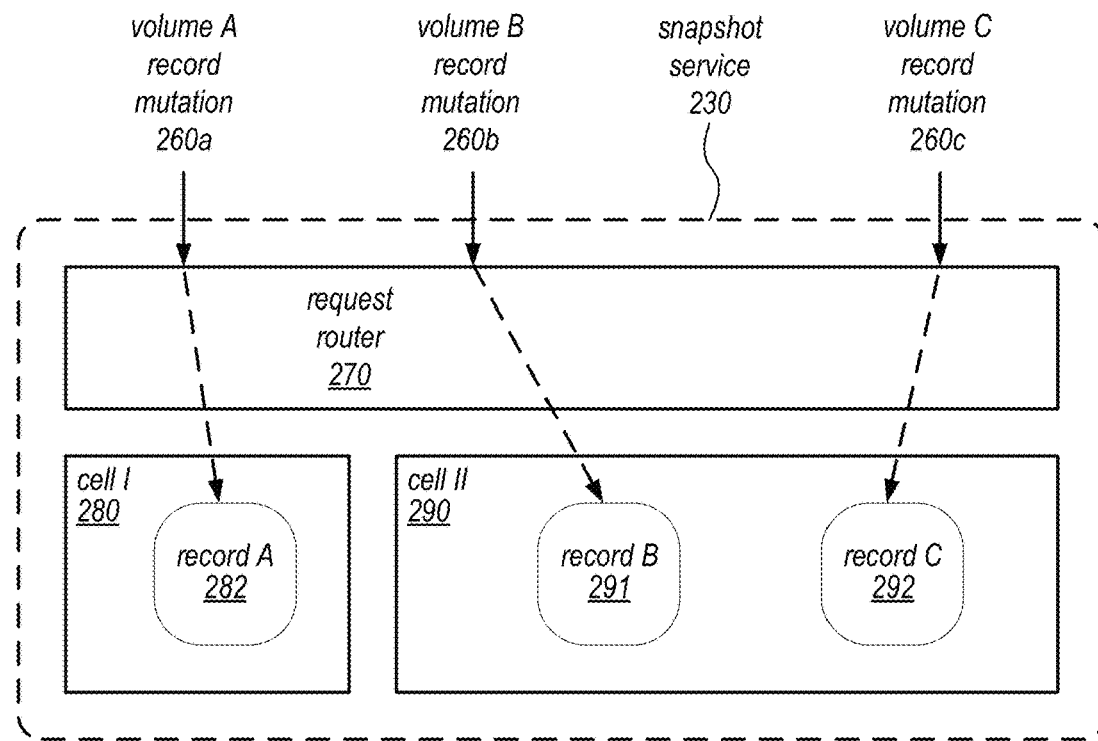
FIGS. 2B and 2C are diagrams illustrating an example cell partitioning process in a snapshotting service that schedules record migrations based on observed record mutations, according to some embodiments.
Figure 2C:
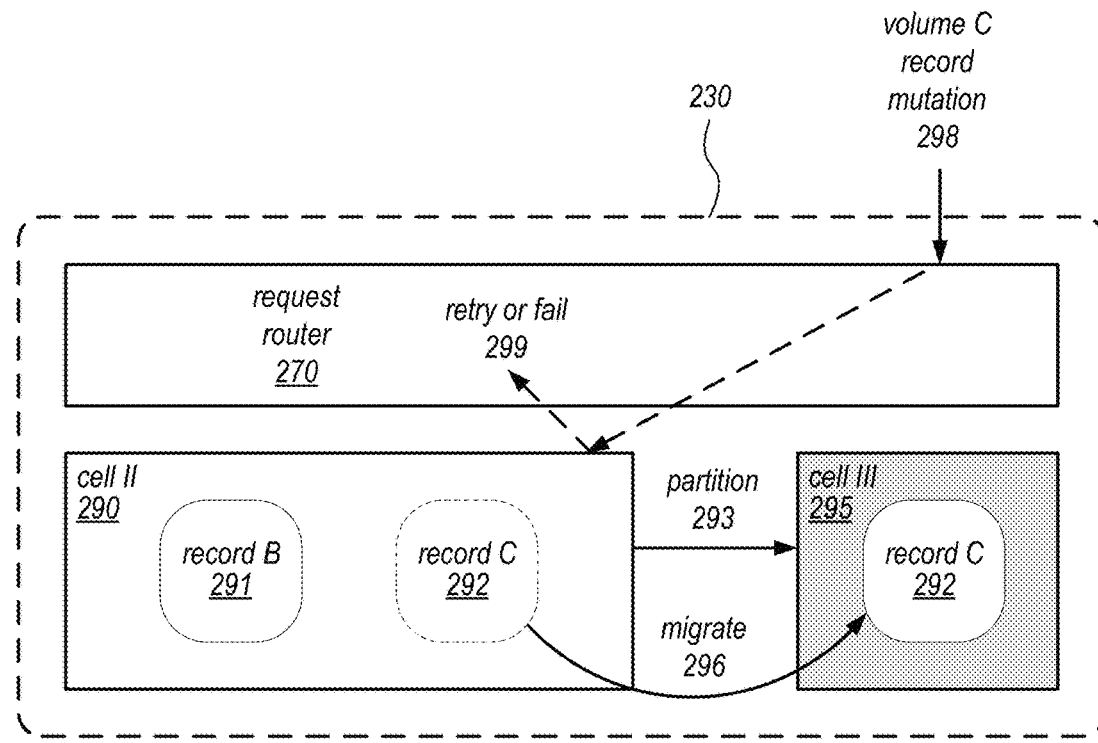

FIGS. 2B and 2C are diagrams illustrating an example cell partitioning process in a snapshotting service that schedules record migrations based on observed record mutations, according to some embodiments. FIG. 2B depicts additional details of the snapshot service 230, in some embodiments. As shown, the snapshot service may include a request routing layer 270, which may be implemented using physical or virtual servers. The request router layer may receive requests for mutations operations, such as operations to initiate snapshot jobs, that modify the snapshot records. In some embodiments, as shown, the computing resources of the snapshot service 230 may be partitioned into distinct cells, such as cell I 280 and cell II 290. In some embodiments, each cell may represent a group of resources, including compute servers and storage devices, that can independently handle record update requests forwarded by the request routers. In some embodiments, different data stores (e.g., volumes A, B, and C) may be assigned to different cells. For example, in the figure, volume A is assigned to cell I, while volumes B and C are assigned to cell II. In some embodiments, each data volume may have one corresponding snapshot record (e.g., records 282, 291, and 292), which is also managed by their respective cells. In some embodiments, the request routing layer 270 maintains the mapping of volume assignments, so that when a request to modify a particular snapshot record is received, the request router 270 is able to forward the request to the correct cell, based on its mapping.

FIG. 2C depicts a partitioning process of the cells, which causes a record migration from one cell to another. As shown, at some point in time, the snapshot service 230 may partition 293 cell II 290 to create a new cell III 295. In some embodiments, the new cell may be created using a subset of computing resources from the original cell. In some embodiments, the new cell may be created from a set of newly provisioned computing resources. In some embodiments, the partition may occur as a result of an autoscaling event. For example, the snapshotting service may determine at some point that cell II 290 is handling too many snapshotting jobs or is hosting too many snapshots for too many data volumes. When this condition is detected, the snapshot service may automatically cause cell II to be partitioned into additional cells.

As shown, once the partitioning 293 occurs, some subset of the snapshots (and snapshot records) are migrated 296 from cell II to the new cell, cell II 295. As explained, this migration process may involve moving the snapshots and snapshot records to server instances in the new cell. In some embodiments, the partition operation may be unplanned and occur without warning. Thus, once the partitioning occurs, a large number of snapshots must be migrated in a relative short period of time. In some embodiments, the scheduling of these migrations is performed by the record migration scheduler 180, as discussed in connection with FIG. 1. In some embodiments, the scheduling may be performed based on a scheduling policy or scheduling rules, so that the migration can be performed as fast as possible given the available resources of the snapshot migrator and migration windows, and at the same time minimizing disruptions to expected snapshotting jobs, as observed by the snapshot service. In some embodiments, the snapshot service may constantly observe the mutation behavior of the snapshot records, so that it can be ready to perform a mass migration of the records whenever partitioning occurs.

In some embodiments, record migrations may be triggered by other operations within the snapshot service 230. For example, in some embodiments, the snapshot service may scale down its computing resources, for example, when a cell becomes too quiet or is hosting a relatively small amount of data. In that case, the snapshot service may merge two cells into one, and the merge process may require some snapshots and snapshot records to be migrated. In some embodiments, the snapshot service may reboot or recycle cells to perform housekeeping or other maintenance tasks. These sorts of activities may also cause snapshot record migrations.

In some embodiments, as shown, the snapshot service may continue to receive service requests (e.g. request 298 to update volume record C) while the records are being migrated. For example, while the partition and record migrations are occurring in the background, a client may still send snapshot request to the snapshot service. If that occurs, a fault may be generated in the records migrator, which may cause the migrator to increment the fault counter as discussed. In some embodiments, as shown, the request router 270 may still attempt to route the request to the original cell associated with volume C (here cell II). In some embodiments, cell II may respond 299 that the snapshot record C needed by the request is currently in migration. In some embodiments, the request router may receive this response, and then retry the request on the new cell, cell III, after a wait period. Thus, this retry process causes added latency to the original request 298. If, after a specified number of retry attempts, cell III is still not able to accept the request, the request router 270 may simply fail the request with a message to the client. As may be understood, this sort of faulting behavior is undesirable, and the scheduling process strives migrate the snapshot records in appropriate times, so as to minimize the probability of such faults.

Figure 3A:
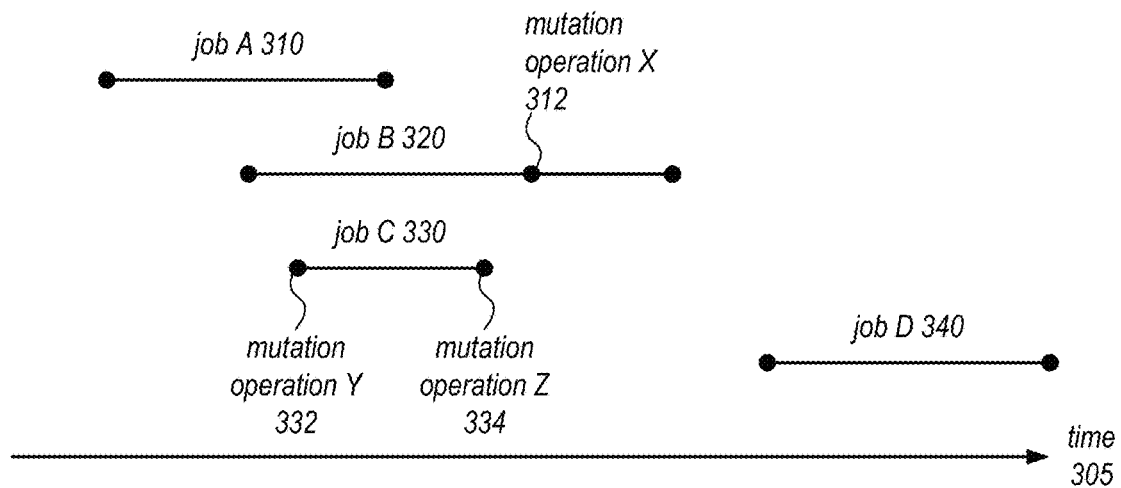
FIGS. 3A to 3C illustrate examples of different record migration windows that are used in a metadata record migration system that schedules record migrations based on observed record mutations, according to some embodiments.
Figure 3B:
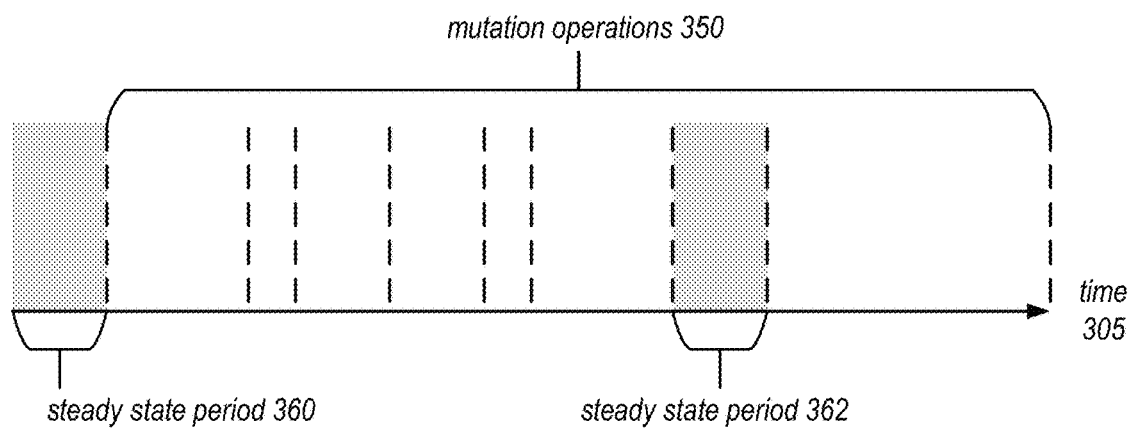
Figure 3C:
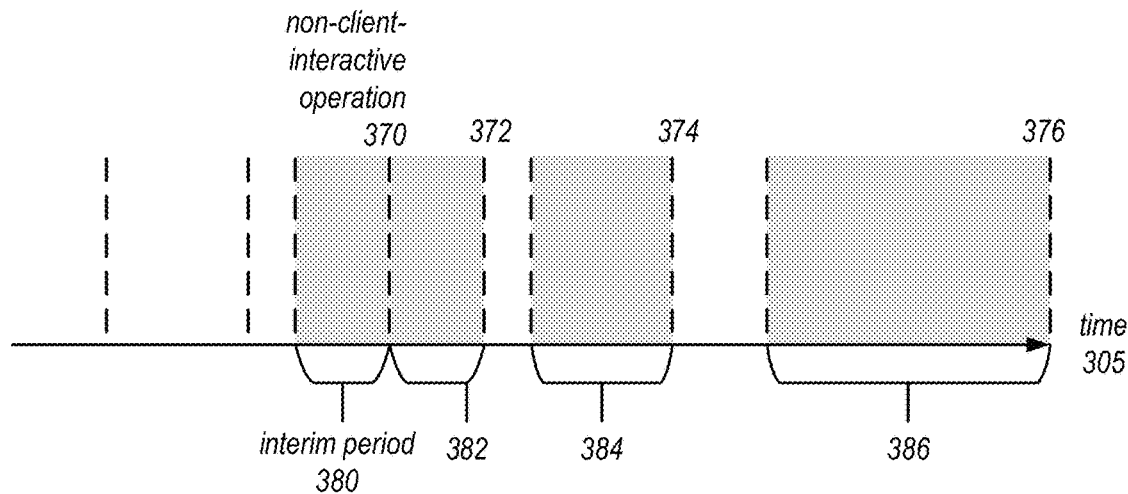

FIGS. 3A to 3C illustrate examples of different record migration windows that are used in a metadata record migration system that schedules record migrations based on observed record mutations, according to some embodiments.

As shown, FIG. 3A depicts a time period 305, where four jobs are observed for a particular metadata record. As shown, jobs A 310, B 320, C 330, and D 340 may be long running jobs, which may in some cases overlap (e.g., jobs A, B, and C). As shown, in the figure, each dot in the job represents a mutation operation. For example, as shown, job A 310 has a beginning and an ending mutation operation that mutates the metadata record. Similarly, job C 330 has a beginning and ending mutation operation, which are labeled operations Y 332 and Z 334 respectively. In addition, job B is shown to have three mutation operations, including operation X 312. Thus, in some embodiments, mutation operations may generally occur at any time during the performance of the job. In some embodiments, the timing data seen in the figure may be captured or collected by, for example, the time data collector 150 of FIG. 1.

FIG. 3B depicts two steady state periods 360 and 362 that are observed during the same period. The time period of FIG. 3B aligns with the time period shown in FIG. 3A. In the figure, each dotted line represents a time when a mutation operation 350 occurred in FIG. 3A. As shown, given the time data of FIG. 3A, there are two steady state periods observed, where no uncompleted jobs are pending on the metadata record. Steady state period 360 occurs before any of the four jobs have started. Steady state period 362 occurs when jobs A, B, and C have completed, but before job D has started. As discussed, in some embodiments, the migration scheduler may prefer to use a steady state window to perform a migration of the metadata record, if possible. However, for some records, this may not be always possible, given the amount and frequency of jobs that mutate the record.

FIG. 3C depicts four interim periods 380, 382, 384, and 386 that are observed during the same period. The time period of FIG. 3C aligns with the time period shown in FIGS. 3A and 3B. Again, each dotted line represents a when a mutation operation occurred in FIG. 3A. As shown, given the time data of FIG. 3A, the period between each adjacent pair of mutation operations may be seen as an interim period, which may be used to migrate the record. In this example, only a subset of interim is used to select the migration time. In particular, only interim periods that end in an ending mutation operation for the job are used. As shown, in this example, each of these ending mutation operations is an operation that is not synchronously visible to clients, that is, does not involve a contemporaneous interaction with the client. For example, the non-synchronously-visible operation may not be initiated by the client or provide immediate feedback to the client. As discussed, in some embodiments, these types of interim periods are preferred as migration windows, because even if a fault occurs in these windows, the impacts of the fault are not directly or immediately experienced by the client. In some embodiments, the migration time selector may first attempt to schedule migration using a steady state period as shown in FIG. 3B, and if that is not possible, attempt to schedule the migration using an interim period as shown in FIG. 3C. As shown, in some cases, there are more interim periods than steady state periods, and the interim periods may be larger than the available steady state periods.

Figure 4:
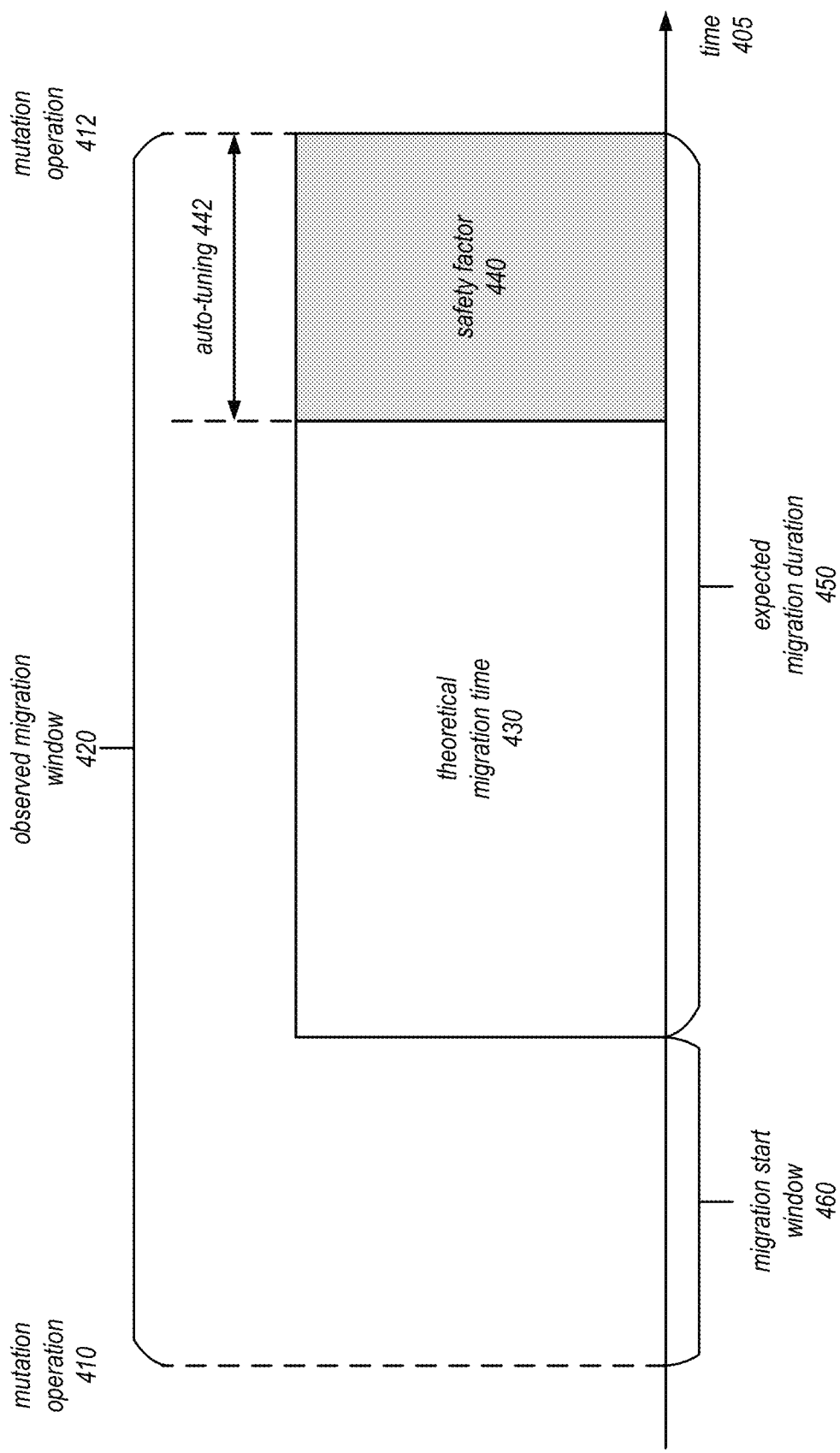
FIG. 4 illustrates an example determination of expected record migration duration in a metadata record migration system that schedules record migrations based on observed record mutations, according to some embodiments.

FIG. 4 illustrates an example determination of expected record migration duration in a metadata record migration system that schedules record migrations based on observed record mutations, according to some embodiments.

As shown, the figure depicts a time period 405 that includes on observed migration window or opportunity 420. As shown, the migration window 420 occurs between two mutation operations 410 and 420. In some embodiments, as discussed, the migration window 420 may be a steady state period or an interim period seen from an analysis of the collected time data. In some embodiments, the migration scheduler may need to determine if an observed window is sufficiently large to perform the record migration. This determination may be performed by comparing an expected migration duration 450 with the size of the observed migration window 420. If the former is smaller than the latter, then the observed migration window 420 is a candidate to perform the migration. Thus, as long as the migration is started within the migration start window 460, the migration is expected to complete within the observed migration window 420, so as to not impact the window-ending mutation operation 412.

As shown, the expected migration duration 450 may be a computed value, which is determined based on two components. First, the expected migration duration may include a theoretical migration time 430. In some embodiments, the theoretical migration time may represent an ideal migration time given perfect system operating conditions or without accounting for system-specific delays. In some embodiments, the theoretical migration time may depend on factors such as the characteristics of the servers performing the migration, the size of the migration record, etc. Second, as shown, the expected migration duration may include a safety factor 440. This safety factor may be a tunable value that is added to the theoretical migration time (or otherwise incorporated), so as to account for varying system conditions at the time of the actual migration. For example, in some embodiments, the actual migration time may be larger than the theoretical migration time, because of factors such as contention for shared resources, network latency, system load, and so no. Thus, by adding the safety factor 440, the scheduling system builds in some degree of tolerance for these types of uncertainties.

As shown, in some embodiments, the safety factor may be auto-tuned 442. For example, in some embodiments, the migration system may grow or shrink the safety factor based on actual observed performance of the migrations. For example, as actual migrations occur, the migrator may track the amount or frequency of faults occur during the migrations. In some embodiments, when the number of faults is deemed to be excessive according to a specified policy (e.g., too many faults within a 24-hour period), the system may increase the safety factor 440 so that larger migrations windows are required. In some embodiments, when the number of faults stay sufficiently low according to a specified policy (e.g., no more than five faults per day for seven consecutive days), the system may decrease the safety factor 440 so that smaller migration window may be used. Thus, the system is able to automatically react to changing system conditions, to perform the migrations as quickly as possible without disturbing any expected jobs. In some embodiments, the system may employ a global safety factor that is used for all migrations, for example, in the snapshotting service. In some embodiments, the system may employ different safety factors for individual data centers, cells, or even servers within the system. In this manner, the system is able to adapt to the changing conditions of different subsets of computing resources that are used to perform the migrations.

Figure 5:
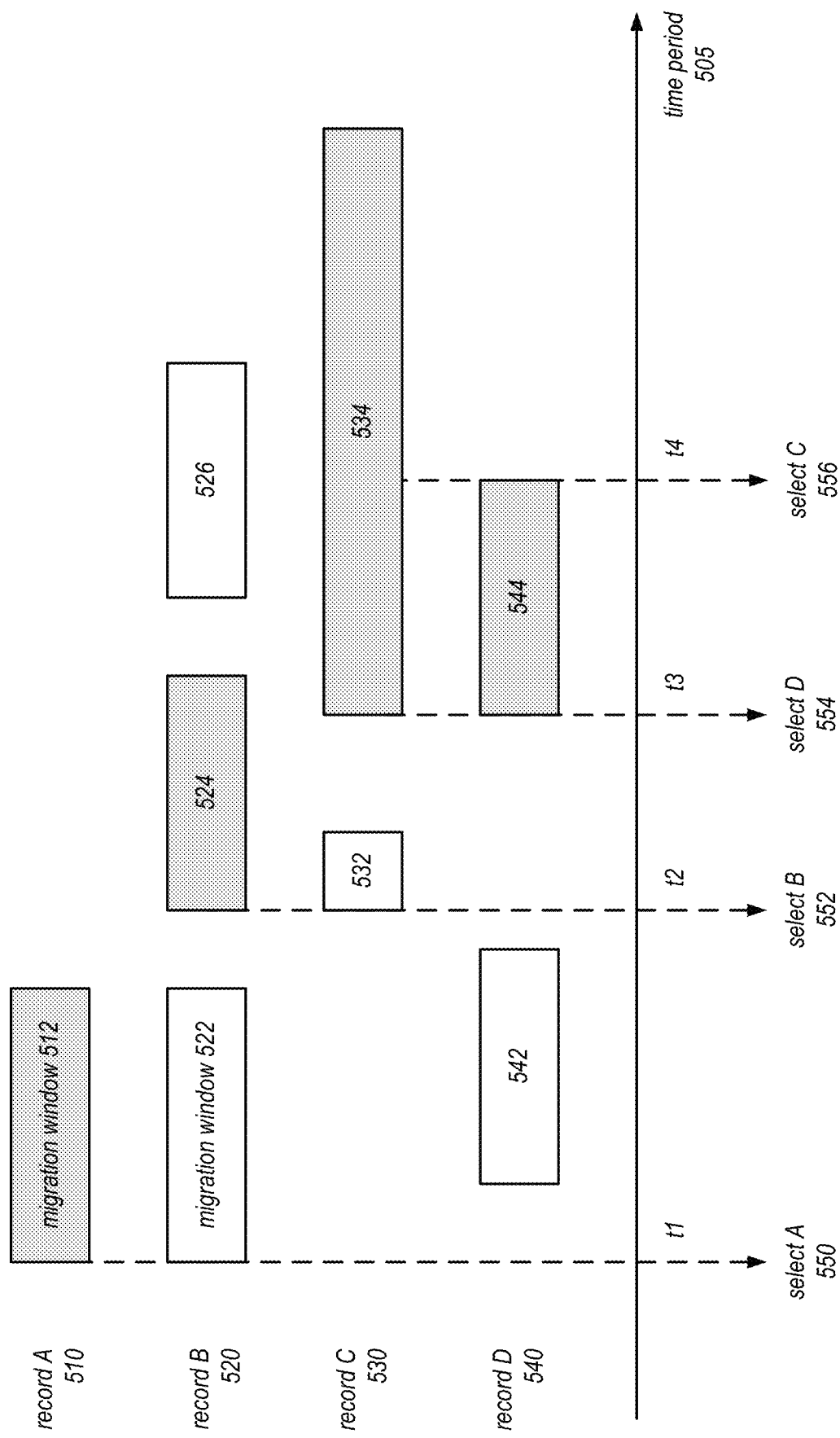
FIG. 5 illustrates an example scheduling of multiple record migrations in a metadata record migration system that schedules record migrations based on observed record mutations, according to some embodiments.

FIG. 5 illustrates an example scheduling of multiple record migrations in a metadata record migration system that schedules record migrations based on observed record mutations, according to some embodiments.

As shown, FIG. 5 depicts the observed migration windows for four records, records A, B, C, and D. In some embodiments, a metadata record management system may need to migrate many records within a short period of time. For example, in a snapshotting service, a cell partitioning operation may cause a large number of migration of snapshot records. In some embodiments, the system may not be able to perform all these migrations in parallel at the same time. For example, the migrations may require use of a shared resource, such as a migration server or a network chokepoint, so that the migrations must be scheduled around these constrains, and also based on each record's available migration windows.

In the illustrated example, each of the four records have their respective available migration windows and must be migrated one at a time. The migration scheduler may use the collected time data of all four records to determine how to schedule the migrations. In the figure, the colored migration windows are the ones chosen by the migration system to perform the migration of that record. As shown, the system first selects at time t1 a migration of record A 510 over record B 520, both of which have an available migration window at that time. In this example, the scheduling system may determine that it is more critical to migrate record A, because record A has no (or relatively few) available migration windows in the period. In this case, record B has other available migration windows other than window 522 (windows 524 and 526). In some embodiments, the scheduling process may be performed using a queue of the records that ranks each record at a given point in time based on the migration windows of all records. In some embodiments, the system may perform a selection from the remaining records to be migrated at different points in time.

As shown, the system next selects at time t2 record B 520 to migrate over record C 530. In this case, the migration window 520 for record C is dangerously small. In some embodiments, the scheduling may take this into account, so that the scheduler prefers to migrate records in migrations windows that are deemed safer, so as to reduce the risk of disruption to the pending jobs in the system.

As shown, the system next selects at time t3 record D 540 to migrate over record C 530, which also has a migration window 544 available at the same time. In this case, the system may select to migrate record D first, because the migration window 534 for record C is relatively large. The system may determine by migrating record D first, there will still be time left to migrate record C after record D in window 534. Indeed, in this example, after the migration of record D is completed, there is sufficient time remaining in window 534 to migrate record C, and record C is migrated at time t4. Accordingly, in this manner, the system may schedule the migration of many records in the system very quickly, based on the available migration windows and available resources, so that the migrations are performed as speedily and safely as possible.

Figure 6:
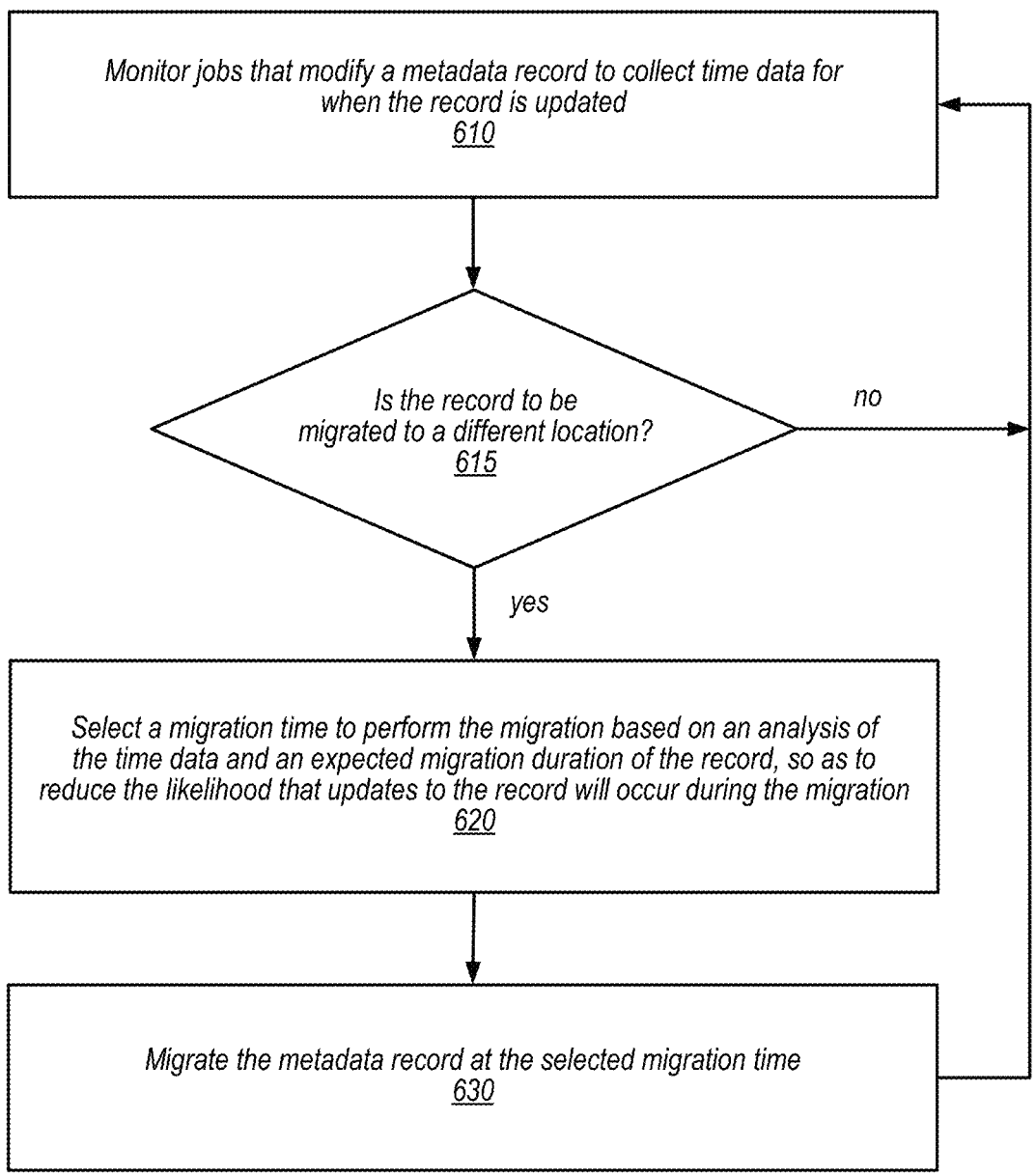
FIG. 6 is a flowchart illustrating a process of determining a migration duration for a record in a metadata record migration system that schedules record migrations based on observed record mutations, according to some embodiments.

FIG. 6 is a flowchart illustrating a process of determining a migration time for a record in a metadata record migration system that schedules record migrations based on observed record mutations, according to some embodiments.

As shown, the process begins at operation 610, where jobs that modify a metadata record are monitored to collect time data for when the record is updated. In some embodiments, the monitoring and collection operation may be performed by, for example, the time data tracker 160 as discussed in connection with FIG. 1. In some embodiments, the jobs may comprise long running snapshot jobs that create incremental snapshots of a data store. These jobs may mutate a snapshot record of the data store at particular mutation operations. In some embodiments, the snapshot record may include information about the sequence of incremental snapshots, references to data chunks or blocks in previous snapshots, and may be used to reconstruct a point-in-time view of the data store at any given time. In some embodiments, time data may be collected for an observation period (e.g., seven days), so that the system can detect regular patterns in the mutation behavior of the metadata record. In some embodiments, the time data may be continuously collected. In some embodiments, the collected time data may include timing information for the mutation operations and the duration of the jobs, etc.

At operation 615, a determination is made whether the record is to be migrated to a different location. In some embodiments, this operation may be performed by, for example, the record migration initiator 170, as discussed in connection with FIG. 1. As discussed, depending on the embodiment, the metadata record may be migrated for a variety of reasons. For example, in some embodiments, the record may be migrated as the results of a partitioning operation or a merging operation, which are performed as part of an autoscaling system. In some embodiments, the migration may be performed as some computing resources are taken down for maintenance, and their duties are taken over by replacement resources. In some embodiments, the migration may be performed as part of a system upgrade of the system. If no migrations are to be performed, the process loops back to operation 610, where the system continues the monitoring of the record. If a migration is to be performed, the process proceeds to operation 620.

At operation 620, a selection of the migration time for the record is made. The selection may be based on an analysis of the collected time data and an expected migration duration of the record. The selection is performed so as to reduce the likelihood that updates to the record will occur during the migration. In some embodiments, the selection may be performed by for example the migration schedule 180, as discussed in connection with FIG. 1. In some embodiments, the collected time data may be analyzed to determine a set of possible migration windows to perform the migration. For example, the scheduler may select steady state periods where no jobs are expected to be pending on the record, or interim periods between adjacent mutation operations seen in the time data. In some embodiments, the selection may rank the available migration windows or sort the windows according to some criteria. The ranking or sorting criteria may depend on for example, how large the window is, how far the window is in the future, how certain the window is to occur, and contention for migration resources during the window, etc. In some embodiments, the mutation behavior of records is highly predictable, so that by examining the past mutation behavior of the record captured in the time data, the scheduler is able to select probable windows where no updates to the record will occur. In some embodiments, the identification or selection of migration windows may depend on an expected migration duration, which indicates an approximation of how long the record migration will take. In some embodiments, the expected migration duration may be adjustable by the system, based on certain performance metrics.

At operation 630, the metadata record is migrated to the different location at the selection migration time. In some embodiments, this operation may be performed by the record migrator 190, as discussed in connection with FIG. 1. In some embodiments, the migration time may be a flexible time that can occur within a start window, such as the migration start window 460 discussed in FIG. 4. In some embodiments, the migration may involve moving the metadata record from one computing resource to another, or one location to another. In some embodiments, the migration may also involve updating a mapping, such as in a request routing layer, to reflect the metadata record's new location.

Figure 7:
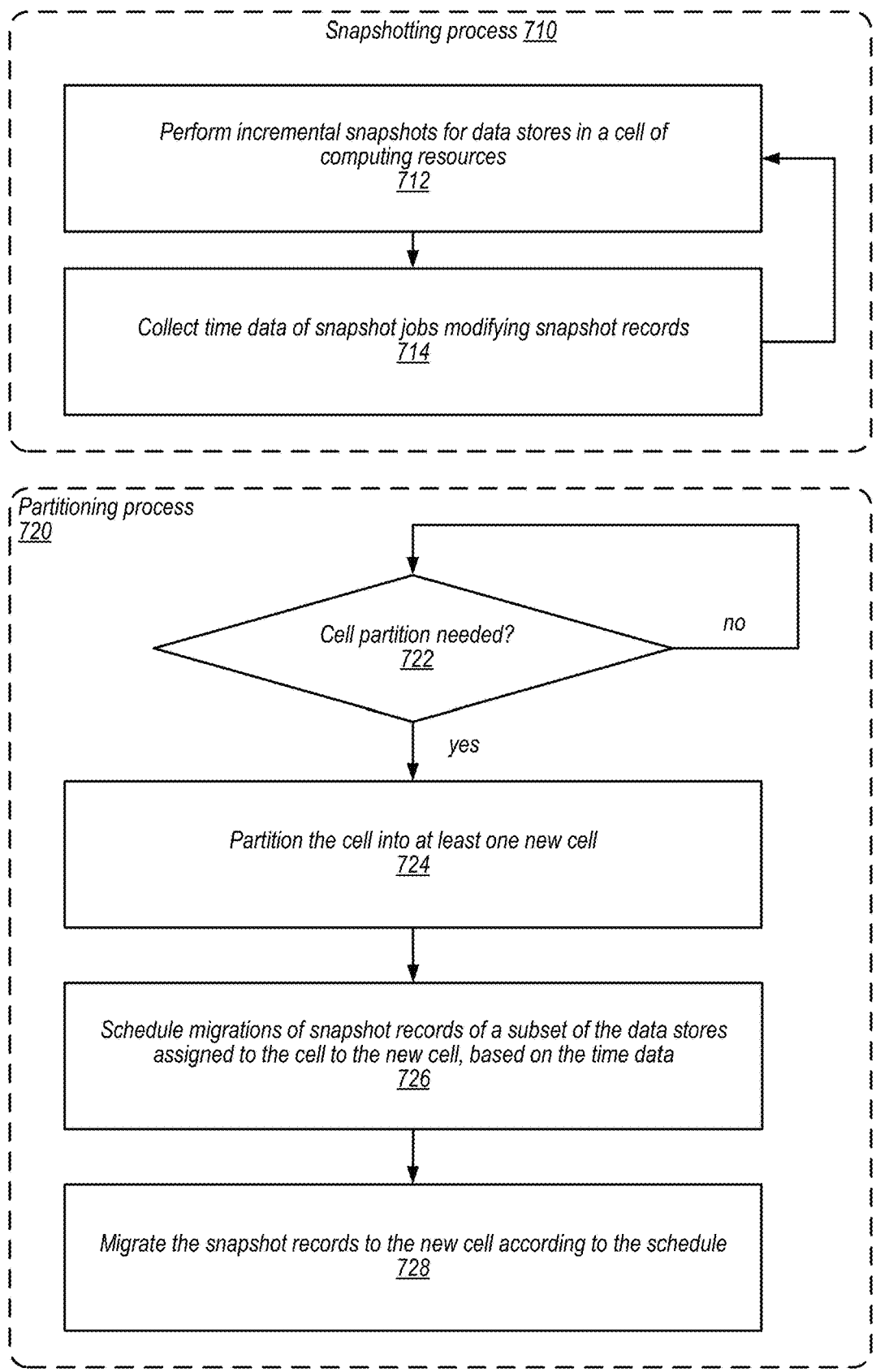
FIG. 7 is a flowchart illustrating a partitioning process that causes record migrations in a data store snapshotting system that schedules record migrations based on observed record mutations, according to some embodiments.

FIG. 7 is a flowchart illustrating a partitioning process that causes record migrations in a data store snapshotting system that schedules record migrations based on observed record mutations, according to some embodiments.

As shown, the process is divided into two subprocesses, a snapshotting process 710 and a partitioning process 720. In some embodiments, the snapshotting process 710 may be performed by worker nodes in a data plane of a snapshotting service, such as snapshot service 240 of FIG. 2. On the other hand, in some embodiments, the partitioning process 720 may be performed components within a control plane of the snapshot service.

In the snapshotting process 710, the process simply repeatedly takes snapshots of different data stores and collect time data for the snapshot jobs. At operation 712, incremental snapshots for data stores are performed. The snapshot may be taken by for example, individual cells of computing resources in the snapshot service, for example, cells 280, 290, and 295 as discussed in connection with FIGS. 2B and 2C. In some embodiments, the snapshots may refer to previous snapshots. In some embodiments, each incremental snapshot may update a snapshot record for that data store.

At operation 714, time data is collected for the snapshot jobs as they modify the snapshot records. This operation may be performed in similar fashion as discussed in connection with operation 610 of FIG. 6. In some embodiments, the snapshot records may include metadata that describe the snapshots of a single data store. The snapshot records may be used to reconstruction a point-in-time view of the data store based on a set of snapshots. In some embodiments, the timing data may be simply maintained in volatile memory. In some embodiments, the timing data may be saved to a more persistent data store, such as a log file or a database. In some embodiments, the collection of time data may be continuous, so that whenever an unexpected migration of snapshot records is required, the time data may be used to schedule the migrations.

In the partitioning process 720, at operation 722, a determination is made whether a cell partitioning is needed. In some embodiments, this operation may be performed by a control plane component of the snapshotting service, which may be tasked with autoscaling the resources in the snapshotting service. For example, when it is determined that one cell is handling too much traffic or hosting too much data, that cell may be automatically partitioned into two more cells, which may divide the traffic or data between the two. As may be seen if a partition is needed, the rest of the partition process 720 is carried out. If not, the partition process 720 simply does nothing.

At operation 724, a cell is partitioned into at least one new cell. As discussed, in some embodiments, when it is determined that one cell is handling too much traffic or hosting too much data, that cell may be automatically partitioned into two more cells, which may divide the traffic or data between the two. In some embodiments, the system may provision a new cell of computing resources as a new cell and transfer some of the data stores assigned to the original cell to the new cell. In some embodiments, the cells may be comprised of virtual machine instances, and the provisioning process may involve launching new virtual machine instances or recruiting unused virtual machine instances from a reserved pool.

At operation 726, a schedule is made for migrations of a subset of snapshot records of the data stores assigned to the cell to the new cell. The scheduling may be based on the time data that was collected at operation 714. In some embodiments, this operation may be performed by for example the migration scheduler 180 of FIG. 1 or snapshot migrator 250 of FIG. 2A. In some embodiments, the selected migration times of the snapshot records may fall within a migration window identified in the time data collected for each respective record, as discussed in connection with operation 620 of FIG. 6. In some embodiments, the selection process may take into account the competing demands different record migrations and resources constraints in the migration system. The scheduler may then perform a scheduling so that all records in the migration subset are migrated as quickly as possible, and with the least amount of disruptions jobs within the system. In some embodiments, a priority queue may be built for different times to prioritize the different records that are waiting to be migrated. In some embodiments, records with fewer available migration windows may be given priority. In some embodiments, records with larger (and thus safer) migration windows may be given priority. In some embodiments, when multiple migration windows of multiple records are available, the scheduler may migrate records whose windows will close earlier first. As may be understood, these are only a few factors that may influence the scheduling process, and different embodiments may employ different factors to schedule these record migrations.

At operation 728, the snapshot record is migrated to the new cell according to the schedule. In some embodiments, this operation may be performed by for example the migration scheduler 180 of FIG. 1 or snapshot migrator 250 of FIG. 2A. Operation 728 may be performed in similar fashion as discussed in connection with operation 630 of FIG. 6. In some embodiments, the migration of the snapshot record may also involve an update to a routing map maintained by a request routing layer, so that future requests will be routed to the new cell of the snapshot record after migration.

Figure 8:
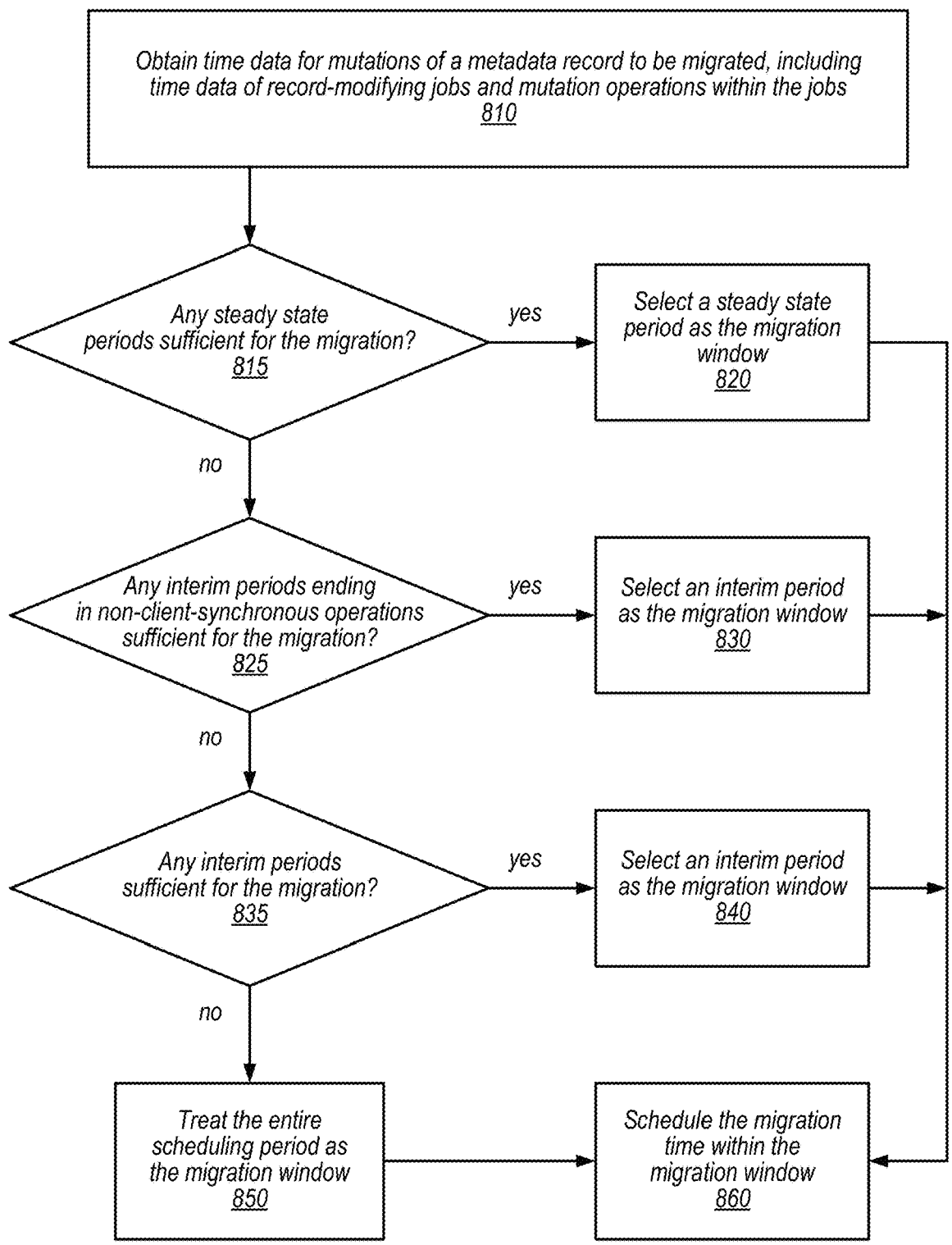
FIG. 8 is a flowchart illustrating a process of selecting different types of migration windows in a metadata record migration system that schedules record migrations based on observed record mutations, according to some embodiments.

FIG. 8 is a flowchart illustrating a process of selecting different types of migration windows in a metadata record migration system that schedules record migrations based on observed record mutations, according to some embodiments. In some embodiments, the process of FIG. 8 may be performed by, for example, the migration scheduler 180 as discussed in connection with FIG. 1.

The process begins at operation 810, where time data is obtained for mutations of a metadata record to be migrated. The time data may include time data of when record-modifying jobs are pending and when mutation operations within the jobs are performed. For example, in some embodiments, the time data may be collected by a time data tracker such as time data tracker 160 of FIG. 1, and the time data may include the data shown in FIG. 3A. In some embodiments, the collected time data may include both the time of the mutation operations as well as the type of the mutation operations. The process then proceeds through several decision operations, as shown, to select a type of migration window to schedule the migration of the record.

At operation 815, a determination is made whether there are any steady state periods in the time data sufficient to carry out the migration. In some embodiments, the steady state periods may be periods where no jobs are expected to be pending for the record. In some embodiments, these types of periods are the most preferred for the migration, because during steady state periods, the metadata record is in a consistent state. In some embodiments, the scheduler may compare an expected migration during of the record to determine steady state periods that are possible candidates for the migration window.

At operation 820, if some steady state periods are found, a steady state period is selected to be the migration window. In some embodiments, the selection may be based on a number of factors such as the size of the period, how soon the period will occur, the certainty that the period will occur, and the competing demands of other migrations and system resource constraints.

At operation 825, if no steady state periods are found, a determination is made whether any interim periods ending in non-client-synchronous operations are sufficient for the migration. In some embodiments, these interim periods may be periods between adjacent mutation operations, where the period-ending operation is not synchronously visible to the client. For example, a snapshot completion operation that does not provide immediate feedback to the client is a non-client-synchronous operation. In some embodiments, these types of periods are more preferred for the migration than other interim periods, because faults or disruptions caused by a migration during these periods are not expected to be immediately perceived by the client.

At operation 830, if some interim period ending in a non-client-synchronous operation is found at operation 825, one such interim period is selected to be the migration window. In some embodiments, the selection may be based on a number of factors such as the size of the period, how soon the period will occur, the certainty that the period will occur, and the competing demands of other migrations and system resource constraints.

At operation 835, if no interim periods ending in non-client-synchronous operations are found at operation 825, a determination is made whether any interim periods at all is sufficient for the migration. In some embodiments, these interim periods may be periods between adjacent mutation operations, so that no mutation operations are expected to occur during these periods.

At operation 840, if some interim periods are found at operation 835, one such interim period is selected to be the migration window. In some embodiments, the selection may be based on a number of factors such as the size of the period, how soon the period will occur, the certainty that the period will occur, and the competing demands of other migrations and system resource constraints.

At operation 850, if no interim periods are found at operation 835, the process may simply treat the entire scheduling period as the migration window. Thus, in this case, the scheduler may determine that it is impossible to perform the migration without impacting some expected mutation operation, and so it will not attempt to choose a migration time within any particular window for that record.

Ultimately, at operation 860, the selected migration window is used to schedule the migration time for the metadata record, so that the metadata record will be migrated within the window. In some embodiments, the migration time may be a flexible time within the migration window, which may be selected by the record migrator at the actual time of migration. Those of ordinary skill in the art would recognize that the types of migration windows illustrate in this figure are merely examples, and that other tiering of migration windows may also be implemented, depending on the embodiment. For example, in some embodiments, different migration windows may be preferred (or not) based on their degree of certainty, the number of jobs pending at that time, or other external factors.

Figure 9:
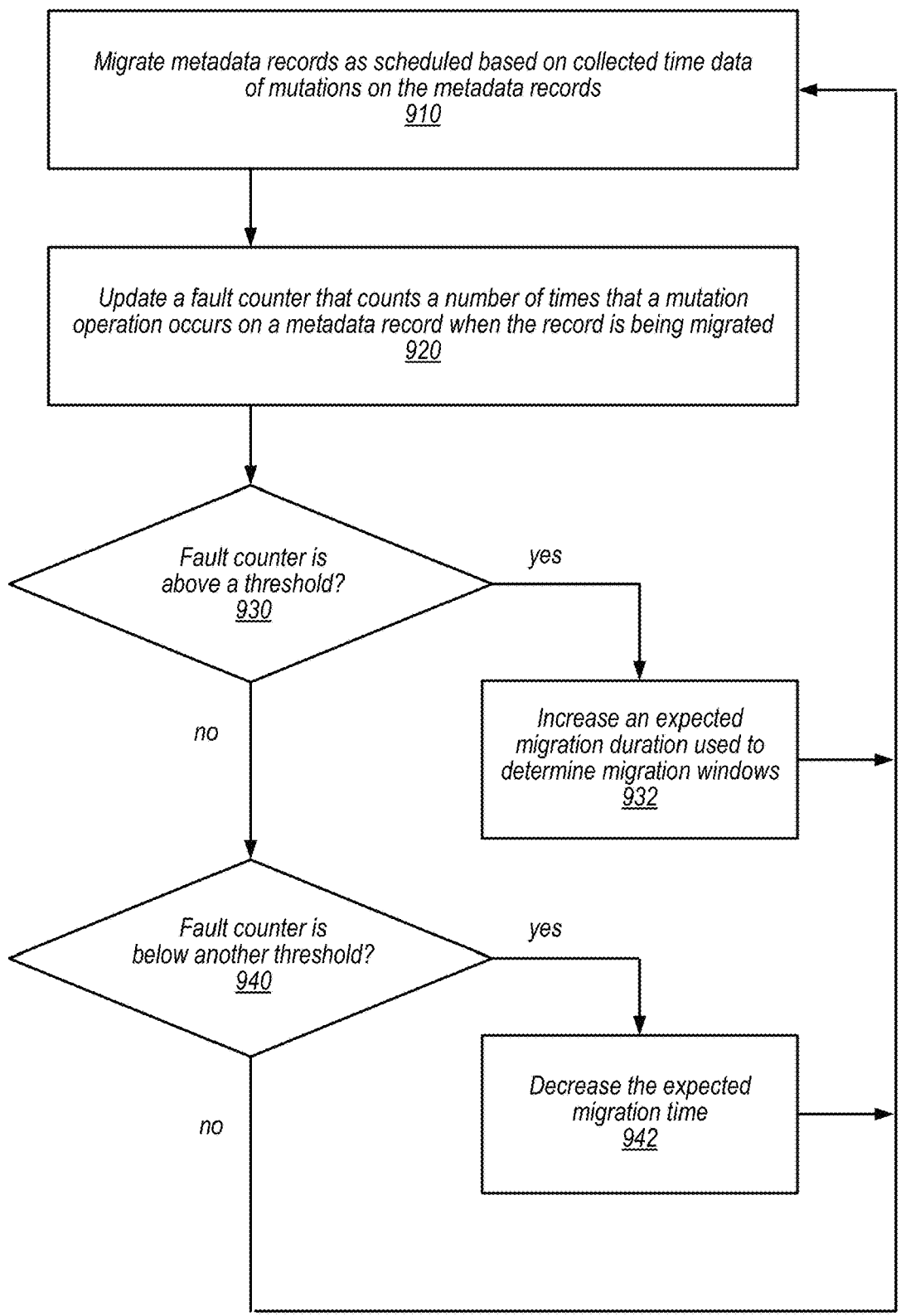
FIG. 9 is a flowchart illustrating a process of adjusting the expected migration duration of record migrations in a metadata record migration system that schedules record migrations based on observed record mutations, according to some embodiments.

FIG. 9 is a flowchart illustrating a process of adjusting the expected migration time of record migrations in a metadata record migration system that schedules record migrations based on observed record mutations, according to some embodiments.

At operation 910, metadata records are migrated as scheduled based on collected time data of mutations on the metadata records. In some embodiments, operation 910 may be performed by components of a metadata record migration manager, such as the record migration manager 150 of FIG. 1. In some embodiments, the scheduling and migration may be performed in similar fashion as discussed in connection with the operations of FIG. 6. In some embodiments, to schedule the migration of each record, the scheduler may compare an expected migration duration of the record with different migration windows seen in the time data.

At operation 920, a fault counter is updated to count a number of times that a mutation operation occurs on a metadata record when the metadata record is being migrated. In some embodiments, this operation may be performed by for example the migration performance tuner 184 of FIG. 1. In some embodiments, when a mutation operation occurs during the migration of a record, this incident may be considered a fault by the migration system. In some embodiments, the mutation operation or the job may be delayed or failed altogether as a result of the fault. In some embodiments, as the migration system migrates records, it may track certain performance metrics, such as a fault count. In some embodiments, the fault count may reflect the quality of the scheduling decisions made by the migration scheduler. In some embodiments, the fault counter may be continually updated to monitor fault counts in the migration system.

At operation 930, a determination is made if the fault counter is above a threshold. In some embodiments, the threshold may be a configurable value that indicates how much fault can be tolerated within the migration system. In some embodiments, the threshold may be a frequency threshold that indicates a maximum number of faults over a given period of time. In some embodiments, when the fault count or frequency exceeds the threshold, the migration system may take corrective action, for example at operation 932.

At operation 932, the expected migration duration that is used to determine migration windows during the scheduling process is increased. As may be understood, by increasing the expected migration duration, the scheduler is forced to select migration windows more conservatively. Thus, this adjustment to the expected migration durable may in some embodiments reduce the number of faults, thereby improving job performance. In some embodiments, the increase may be accomplished by increasing a safety factor that is used to compute the expected migration duration.

At operation 940, another determination is made if the fault counter is below another threshold. In some embodiments, the other threshold may be a configurable value that indicates a level of fault can be tolerated within the migration system. In some embodiments, the threshold may be a frequency threshold that indicates a number of faults over a given period of time. In some embodiments, when the fault count or frequency is below the threshold, possibly for a sufficient period of time, the migration system may take advantage of the good performance of the scheduler, for example at operation 942.

At operation 942, the expected migration duration is decreased. As may be understood, by decreasing the expected migration duration, the scheduler is allowed to select migration windows more aggressively. Thus, this adjustment to the expected migration durable may in some embodiments result in faster migrations, thereby improving record migration performance. In some embodiments, the decrease may be accomplished by decreasing a safety factor that is used to compute the expected migration duration. As shown, the process than loops back to operation 910, so that the entire process continually monitors migration performance and adjusts its scheduling behavior to the migration performance.

Figure 10:
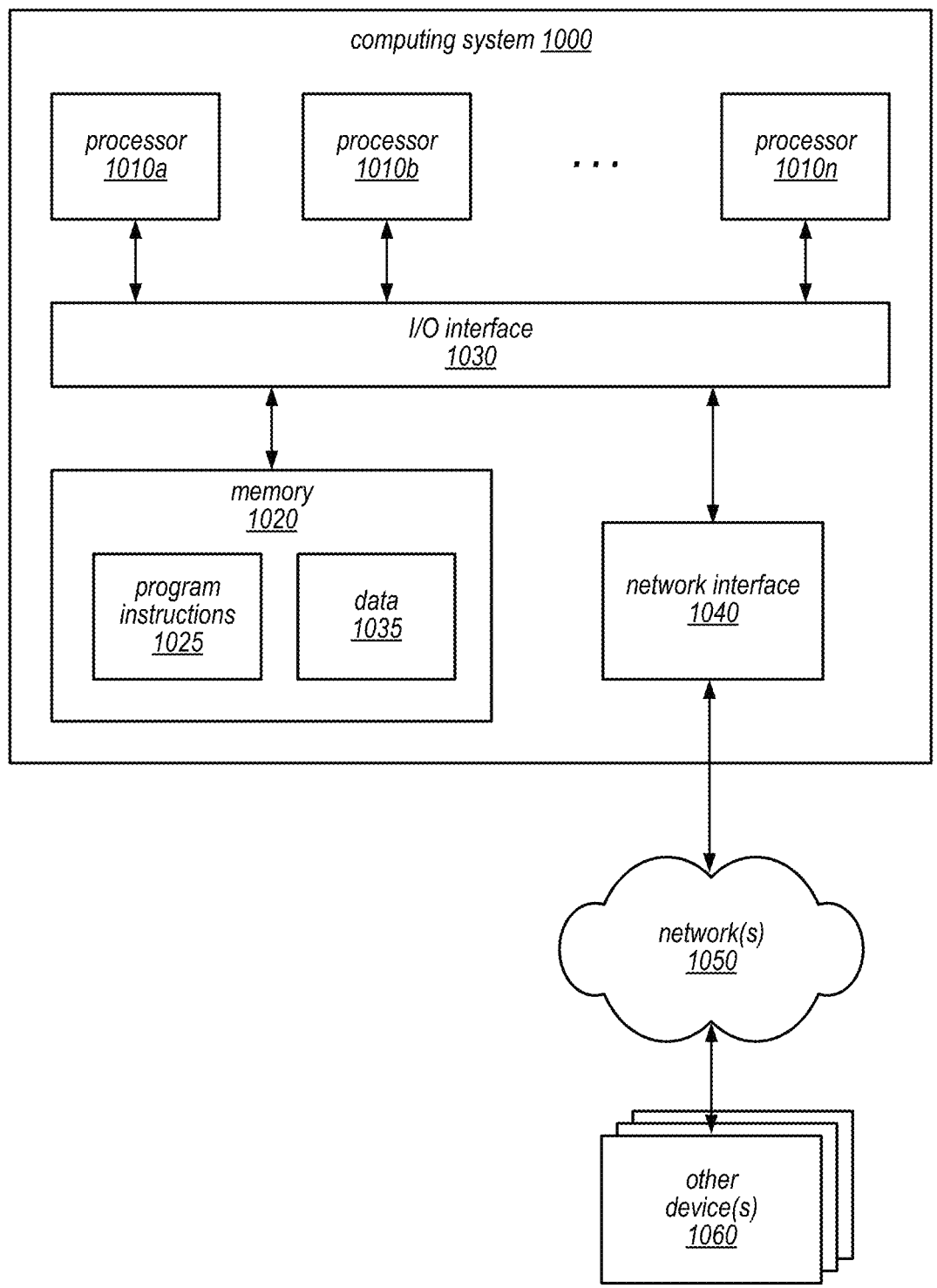
FIG. 10 is a block diagram illustrating an example computer system that can be used to implement one or more portions of a metadata record migration system that schedules record migrations based on observed record mutations, according to some embodiments.

FIG. 10 is a block diagram illustrating an example computer system that can be used to implement one or more portions of a metadata record migration system that schedules record migrations based on observed record mutations, according to some embodiments. Computer system 1000 may include or be configured to access one or more nonvolatile computer-accessible media. In the illustrated embodiment, computer system 1000 includes one or more processors 1010 coupled to a system memory 1020 via an input/output (I/O) interface 1030. Computer system 1000 further includes a network interface 1040 coupled to I/O interface 1030.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1020 as code 1025 and data 1035.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 920, may be incorporated directly into processor 1010.

Network interface 1040 may be configured to allow data to be exchanged between computer system 1000 and other devices 1060 attached to a network or networks 1050, such as other computer systems or devices, such as routers and other computing devices, as illustrated in FIGS. 1 through 9, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above for FIGS. 1 through 9 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or nonvolatile media such as RAM (e.g. SDRAM, DDR SDRAM, RDRAM, SRAM, etc.), ROM, etc, that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

The invention claimed is:

1. A system, comprising:
one or more computing devices that implement:
a data storage system configured to store a plurality of metadata records at a storage location and update the metadata records;
a record migration manager configured to:
monitor the updates to metadata records to collect time data for individual ones of the metadata records indicating when the metadata records are updated;
determine that a metadata record is to be migrated to a different storage location;
select a migration time to perform the migration of the metadata record, wherein the selection is based at least in part on an analysis of the time data and an expected migration duration of the metadata record, and the selection reduces a likelihood of a fault generated by one or more updates to the metadata record while the migration is pending; and
migrate the metadata record to the different storage location at the migration time.

2. The system of claim 1, wherein:
wherein to monitor the updates and collect the time data, the record migration manager is configured to:
monitor jobs that perform one or more mutation operations that modify the metadata record and collect respective types and times of the mutation operations; and
wherein to select the migration time, the record migration manager is configured to:
select an interim period between two adjacent mutation operations in the time data that ends in a particular type of mutation operation.

3. The system of claim 2, wherein the particular type of the mutation operation is a type that is not synchronously visible to clients of the data storage system.

4. The system of claim 2, wherein:
the one or more computing devices implements a snapshotting service that takes incremental snapshots for a plurality of data stores;
the metadata record comprises a record of the incremental snapshots for a data store;
the jobs comprise snapshot jobs, and the mutation operations include a snapshot initiation operation and a snapshot completion operation; and
wherein to select the migration time, the record migration manager is configured to determine an interim period that ends in a snapshot completion operation.

5. The system of claim 1, wherein the record migration manager configured to:
count via a fault counter a number of times that a fault occurs for an update to some metadata record occurs while a migration of that metadata record is pending; and
responsive to a determination that the fault counter exceeds a threshold, increase the expected migration duration.

6. A computer-implemented method, comprising:
collecting time data indicating when individual ones or a plurality of metadata records at a storage location are updated;
determining that a metadata record is to be migrated to a different storage location;
selecting a time to perform the migration of the metadata record, wherein the selection is based at least in part on an analysis of the time data and an expected migration duration of the metadata record, and the selection is made to reduce a likelihood of a fault generated by one or more updates to the metadata record while the migration is pending; and
migrating the metadata record to the different storage location at the migration time.

7. The method of claim 6, wherein
wherein collecting the time data comprises monitoring jobs that perform one or more mutation operations that modify the metadata record and collecting respective types and times of the mutation operations; and
wherein selecting the migration time comprises determining an interim period between two adjacent mutation operations in the time data that ends in a particular type of mutation operation.

8. The method of claim 7, wherein the particular type of the mutation operation is a type that is not synchronously visible to clients that update the metadata records.

9. The method of claim 7, wherein:
the one or more computing devices implements a snapshotting service that takes incremental snapshots for a plurality of data stores,
the metadata record comprises a record of the incremental snapshots for a data store,
the jobs comprise snapshot jobs, and the mutation operations include a snapshot initiation operation and a snapshot completion operation, and
selecting the migration time comprises determining an interim period that ends in a snapshot completion operation.

10. The method of claim 9, wherein:
the metadata record is managed by one cell of a plurality of cells of computing resources in the snapshotting service,
the snapshotting service is configured to partition the one cell into at least one addition cell in response to a partitioning event, and
migrating the metadata record comprises moving the metadata record from the one cell to the additional cell.

11. The method of claim 7, further comprising:
determining that another metadata record is to be migrated;
selecting another migration time of the other metadata record within a steady state of the other metadata record, wherein the steady state period is a period where no jobs that modify the other metadata record are expected to be pending according to time data; and
migrating the metadata record during the other migration time.

12. The method of claim 11, wherein said selecting of the interim period is performed after a determination that it is not possible to migrate the metadata record in a steady state period of the metadata record.

13. The method of claim 6, wherein the expected migration duration of the metadata record includes a safety factor, and further comprising:
adjusting the safety factor based at least in part on one or more performance metrics.

14. The method of claim 6, further comprising:
counting via a fault counter a number of times that a fault occurs for an update to some metadata record while a migration of that metadata record is pending; and
responsive to a determination that the fault counter exceeds a threshold, increasing the expected migration duration.

15. The method of claim 14, further comprising:
responsive to a determination that the fault counter is below another threshold, decreasing the expected migration duration.

16. A non-transitory computer-accessible storage medium storing program instructions that when executed on one or more processors of a computer device, cause the computer device to:
collect time data indicating when individual ones or a plurality of metadata records at a storage location are updated;
determine that a metadata record is to be migrated to a different storage location;
select a time to perform the migration of the metadata record, wherein the selection is based at least in part on an analysis of the time data and an expected migration duration of the metadata record, and the selection is made to reduce a likelihood of a fault generated by one or more updates to the metadata record while the migration is pending; and
migrate the metadata record to the different storage location at the migration time.

17. The non-transitory computer-accessible storage medium of claim 16, wherein:
to collect the time data, the program instructions when executed on the one or more processors cause the computer device to:
monitor jobs that perform one or more mutation operations that modify the metadata record and collect respective types and times of the mutation operations; and
to select the migration time, the program instructions when executed on the one or more processors cause the computer device to:
select an interim period between two adjacent mutation operations in the time data that ends in a particular type of mutation operation.

18. The non-transitory computer-accessible storage medium of claim 17, wherein to select the migration time, the program instructions when executed on the one or more processors cause the computer device to select an interim period ending in a type of the mutation operation that is not synchronously visible to clients that update the metadata records.

19. The non-transitory computer-accessible storage medium of claim 17, wherein:
the jobs comprise snapshot jobs that creates incremental snapshots of data stores, and the mutation operations include a snapshot initiation operation and a snapshot completion operation;
the metadata record comprises a record of the incremental snapshots for a data store; and
to select the migration time, the program instructions when executed on the one or more processors cause the computer device to determine an interim period that ends in a snapshot completion operation.

20. The non-transitory computer-accessible storage medium of claim 16, wherein the program instructions when executed on the one or more processors cause the computer device to:
count via a fault counter a number of times that a fault occurs for an update to some metadata record while a migration of that metadata record is pending; and
responsive to a determination that the fault counter exceeds a threshold, increase the expected migration time.

* * * * *